United States Patent
Castagna et al.

(10) Patent No.: US 10,264,056 B2
(45) Date of Patent: Apr. 16, 2019

(54) MULTICOMPUTER PROCESSING OF AN EVENT REQUEST FROM AN EVENT ORIGINATION DEVICE WITH CENTRALIZED EVENT ORCHESTRATION

(71) Applicant: Bank of America Corporation, Charlotte, NC (US)

(72) Inventors: Brandon Matthew Castagna, Mount Holly, NC (US); Chris Lord, Charlotte, NC (US); Rob Oddy, London (GB); Nick Pearson, Ipswich (GB); David McGinness, Charlotte, NC (US); Kevin Hicks, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 314 days.

(21) Appl. No.: 15/372,690

(22) Filed: Dec. 8, 2016

(65) Prior Publication Data
US 2018/0167441 A1    Jun. 14, 2018

(51) Int. Cl.
G06F 15/16 (2006.01)
H04L 29/08 (2006.01)
G06F 9/46 (2006.01)

(52) U.S. Cl.
CPC .............. *H04L 67/10* (2013.01); *G06F 9/465* (2013.01); *H04L 29/08135* (2013.01); *H04L 29/08972* (2013.01)

(58) Field of Classification Search
CPC .. H04L 29/08135–29/08297; H04L 29/08945; H04L 29/08972; H04L 67/10; G06F 9/46; G06F 9/465
See application file for complete search history.

(56) References Cited

U.S. PATENT DOCUMENTS

| 5,581,691 | A | * | 12/1996 | Hsu | G06F 9/4494 |
| | | | | | 714/15 |
| 5,787,402 | A | | 7/1998 | Potter et al. | |
| 6,247,000 | B1 | | 6/2001 | Hawkins et al. | |
| 6,721,716 | B1 | | 4/2004 | Gross | |
| 7,031,944 | B2 | * | 4/2006 | Tanioka | G06F 9/5072 |
| | | | | | 705/50 |
| 7,580,886 | B1 | | 8/2009 | Schulz | |

(Continued)

*Primary Examiner* — Brendan Y Higa
(74) *Attorney, Agent, or Firm* — Banner & Witcoff, Ltd.; Michael A. Springs

(57) ABSTRACT

Aspects of the disclosure relate to multicomputer processing of an event request from an event origination device with centralized event orchestration. A computing platform may receive, from an event origination device, an event request for an event. Subsequently, the computing platform may determine a sub-event associated with the event. Next, the computing platform may receive, from an event dataset customization engine, an event customized dataset generated for the sub-event. Then, the computing platform may generate, based on the sub-event associated with the event received from the event origination device, one or more event orchestration commands directing a sub-event processing device to execute the sub-event. Thereafter, the computing platform may receive, from the sub-event processing device, a results dataset. Subsequently, the computing platform may update, based on the results dataset, a master event dataset associated with the event.

20 Claims, 12 Drawing Sheets

(56) References Cited

U.S. PATENT DOCUMENTS

| | | | |
|---|---|---|---|
| 7,689,483 B2 | 3/2010 | Wu et al. | |
| 8,560,452 B2 | 10/2013 | Lynch et al. | |
| 8,606,705 B2 | 12/2013 | Zanzot et al. | |
| 8,620,805 B2 | 12/2013 | Davis et al. | |
| 8,819,106 B1* | 8/2014 | Sirota | G06F 9/485 709/201 |
| 9,110,719 B2* | 8/2015 | Hartman | G06F 17/30091 |
| 9,946,577 B1* | 4/2018 | Stafford | H04L 67/10 |
| 2001/0049713 A1* | 12/2001 | Arnold | G06F 9/5044 718/105 |
| 2007/0124363 A1* | 5/2007 | Lurie | G06F 9/5072 709/202 |
| 2010/0280949 A1 | 11/2010 | Van Rensburg | |
| 2011/0282780 A1 | 11/2011 | French et al. | |
| 2013/0054735 A1* | 2/2013 | Chu | G06F 9/5022 709/217 |
| 2013/0232180 A1* | 9/2013 | Grube | H04L 29/08135 707/827 |
| 2016/0182331 A1 | 6/2016 | Iannaccone et al. | |
| 2016/0184701 A1 | 6/2016 | Weston et al. | |
| 2016/0187654 A1 | 6/2016 | Border et al. | |
| 2016/0188181 A1 | 6/2016 | Smith | |
| 2016/0189299 A1 | 6/2016 | Chiulli et al. | |
| 2016/0196553 A1 | 7/2016 | Barhydt | |
| 2016/0196587 A1 | 7/2016 | Eder | |
| 2016/0196608 A1 | 7/2016 | Chiulli et al. | |
| 2016/0197993 A1 | 7/2016 | Perkowski et al. | |
| 2016/0205174 A1 | 7/2016 | Pitio et al. | |
| 2016/0209648 A1 | 7/2016 | Haddick et al. | |
| 2016/0210224 A1 | 7/2016 | Cohen et al. | |
| 2016/0210605 A1 | 7/2016 | Vaish et al. | |
| 2016/0217258 A1 | 7/2016 | Pitroda et al. | |
| 2016/0219152 A1 | 7/2016 | Fernandez et al. | |
| 2016/0224951 A1 | 8/2016 | Hoffberg | |
| 2016/0226308 A1 | 8/2016 | Valin et al. | |
| 2016/0226836 A1 | 8/2016 | Garcia et al. | |
| 2016/0240050 A1 | 8/2016 | Block et al. | |
| 2016/0246616 A1 | 8/2016 | Kwong | |
| 2016/0247148 A1 | 8/2016 | Jivan et al. | |
| 2016/0253360 A1 | 9/2016 | Gradin et al. | |
| 2016/0253650 A1 | 9/2016 | Cohen | |
| 2016/0260067 A1 | 9/2016 | Holman et al. | |
| 2016/0260069 A1 | 9/2016 | Holman et al. | |
| 2016/0266939 A1 | 9/2016 | Shear et al. | |
| 2016/0275558 A1 | 9/2016 | Tiku et al. | |
| 2016/0275760 A1 | 9/2016 | Block et al. | |
| 2016/0283923 A1 | 9/2016 | Hertel et al. | |
| 2016/0291863 A1 | 10/2016 | Miron | |
| 2016/0292683 A1 | 10/2016 | Song et al. | |
| 2016/0292786 A1 | 10/2016 | Khizhnyak et al. | |
| 2016/0292963 A1 | 10/2016 | Chun et al. | |
| 2016/0300196 A1 | 10/2016 | Guido et al. | |
| 2016/0300197 A1 | 10/2016 | Guido et al. | |
| 2016/0300198 A1 | 10/2016 | Guido et al. | |
| 2016/0300199 A1 | 10/2016 | Guido et al. | |
| 2016/0300204 A1 | 10/2016 | Guido et al. | |
| 2016/0306751 A1 | 10/2016 | Amarendran et al. | |
| 2016/0306984 A1 | 10/2016 | Amarendran et al. | |
| 2016/0314443 A1 | 10/2016 | Liberty | |
| 2016/0314640 A1 | 10/2016 | Ward et al. | |
| 2016/0321624 A1 | 11/2016 | Brunner | |
| 2016/0328706 A1 | 11/2016 | Kennedy | |
| 2016/0328723 A1 | 11/2016 | Cunnane | |
| 2016/0342977 A1 | 11/2016 | Lam | |
| 2016/0343081 A1 | 11/2016 | Somech et al. | |
| 2016/0343094 A1 | 11/2016 | Forbes, Jr. | |
| 2016/0343100 A1 | 11/2016 | Davenport et al. | |
| 2016/0350856 A1 | 12/2016 | Sandhu et al. | |
| 2016/0358103 A1* | 12/2016 | Bowers | G06N 99/005 |
| 2017/0004422 A1* | 1/2017 | Todd | G06Q 10/0633 |

* cited by examiner

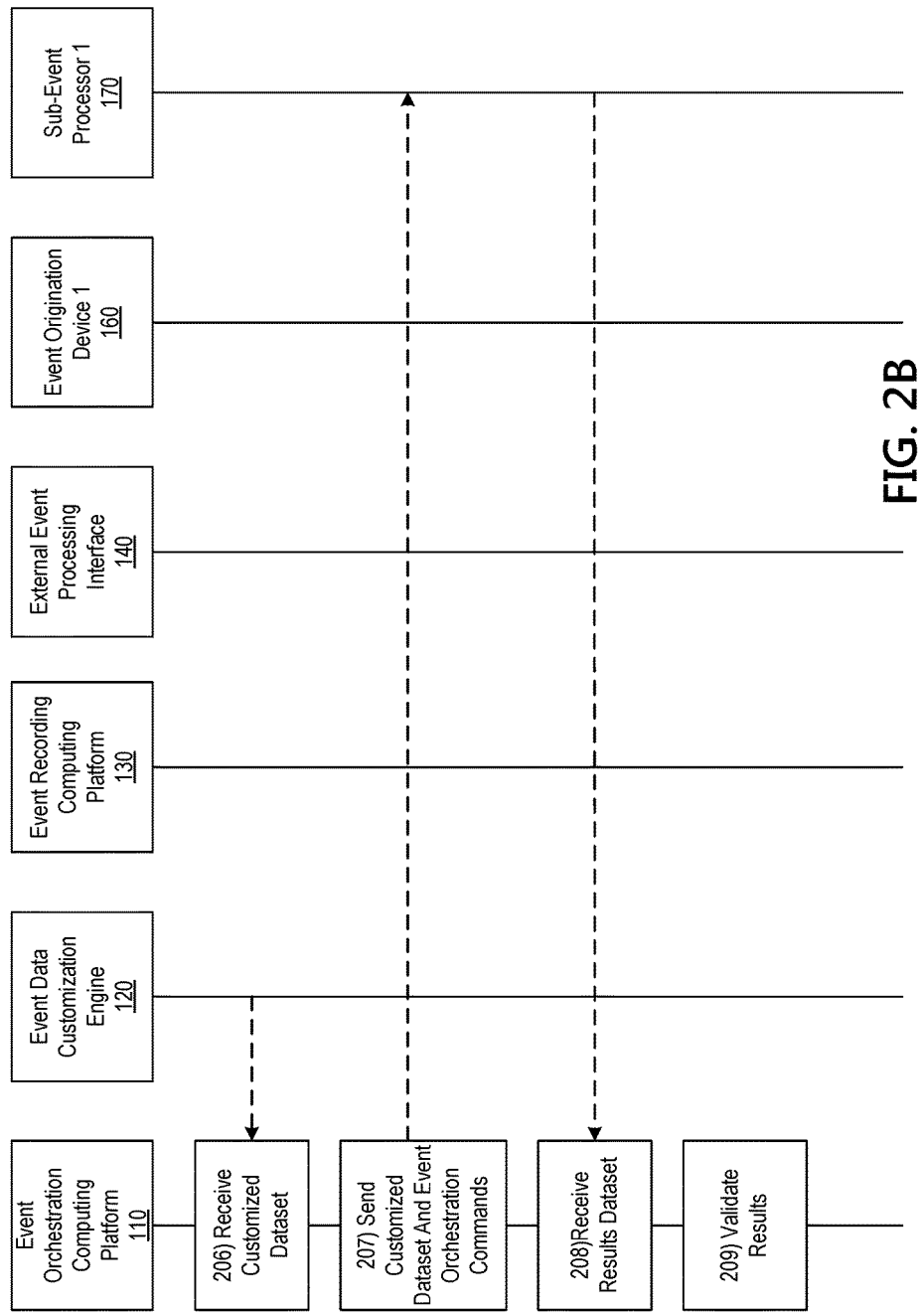

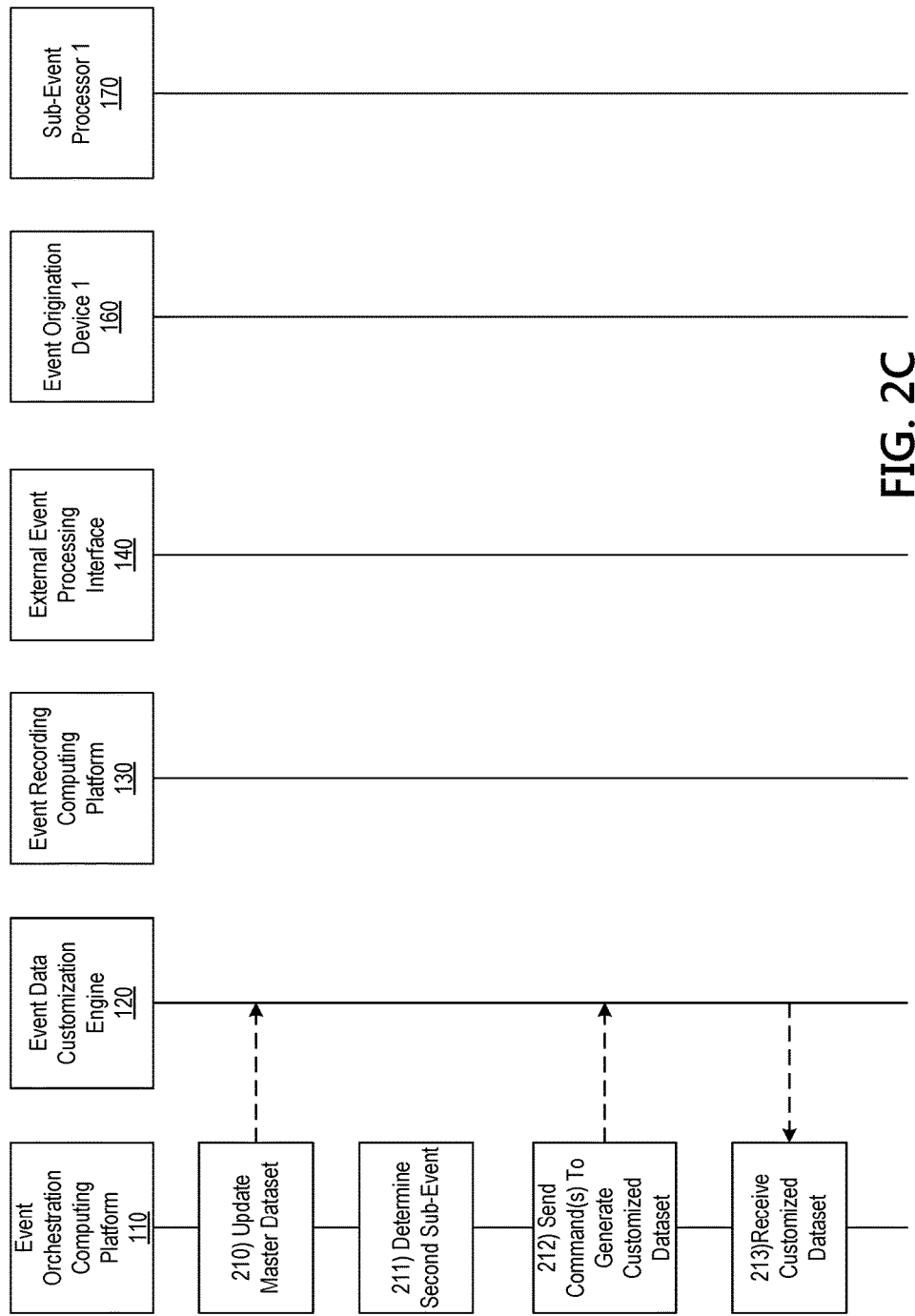

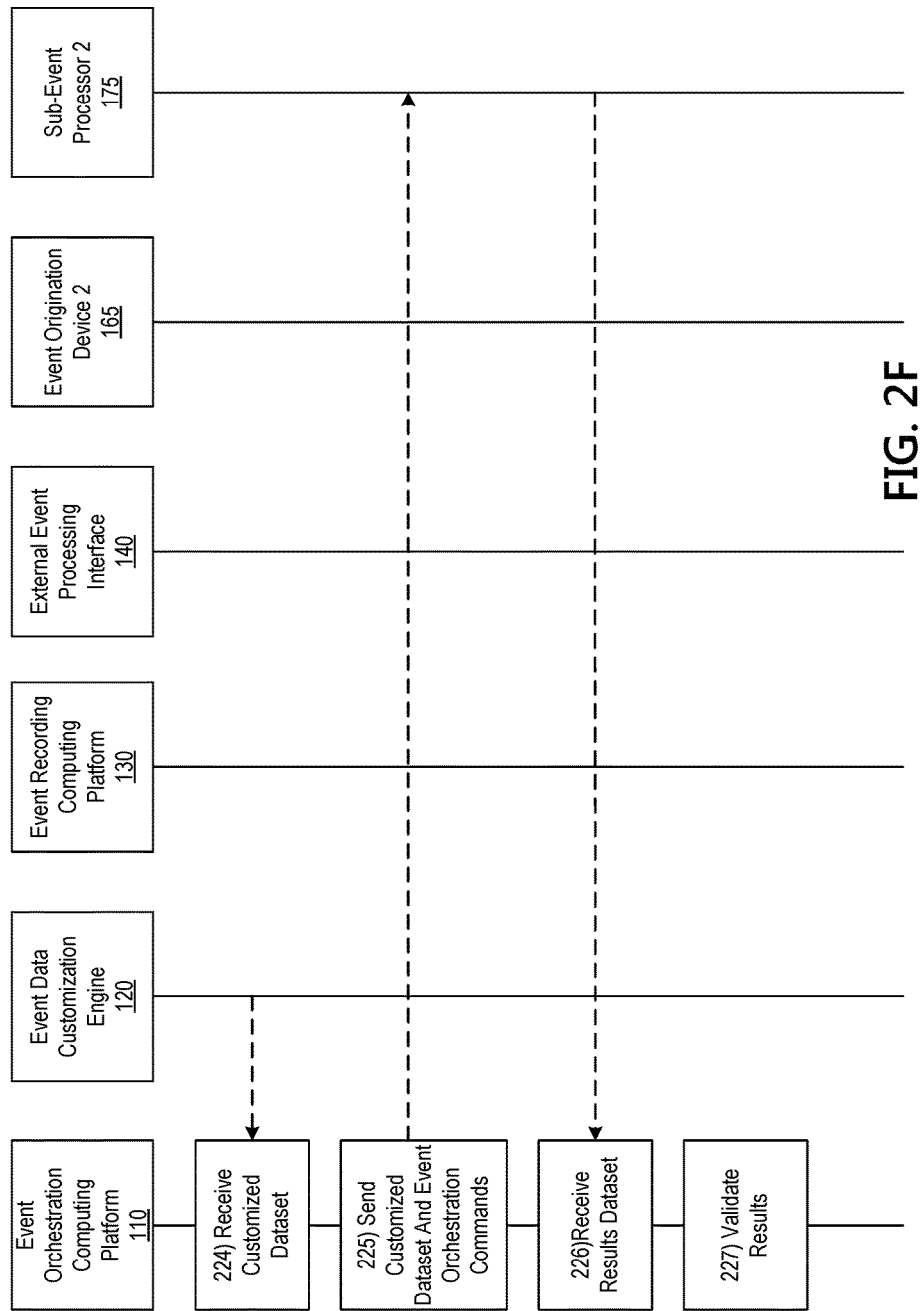

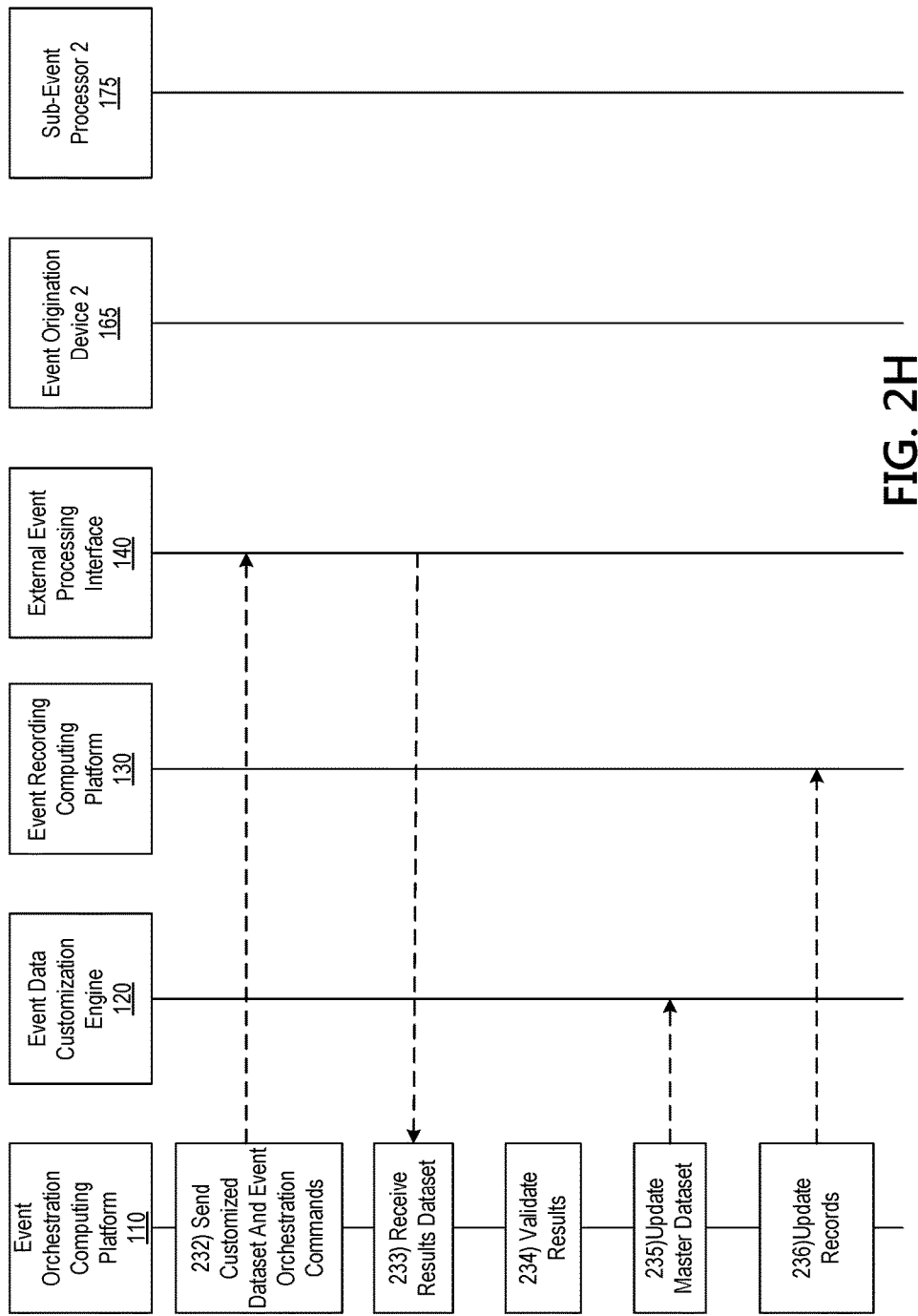

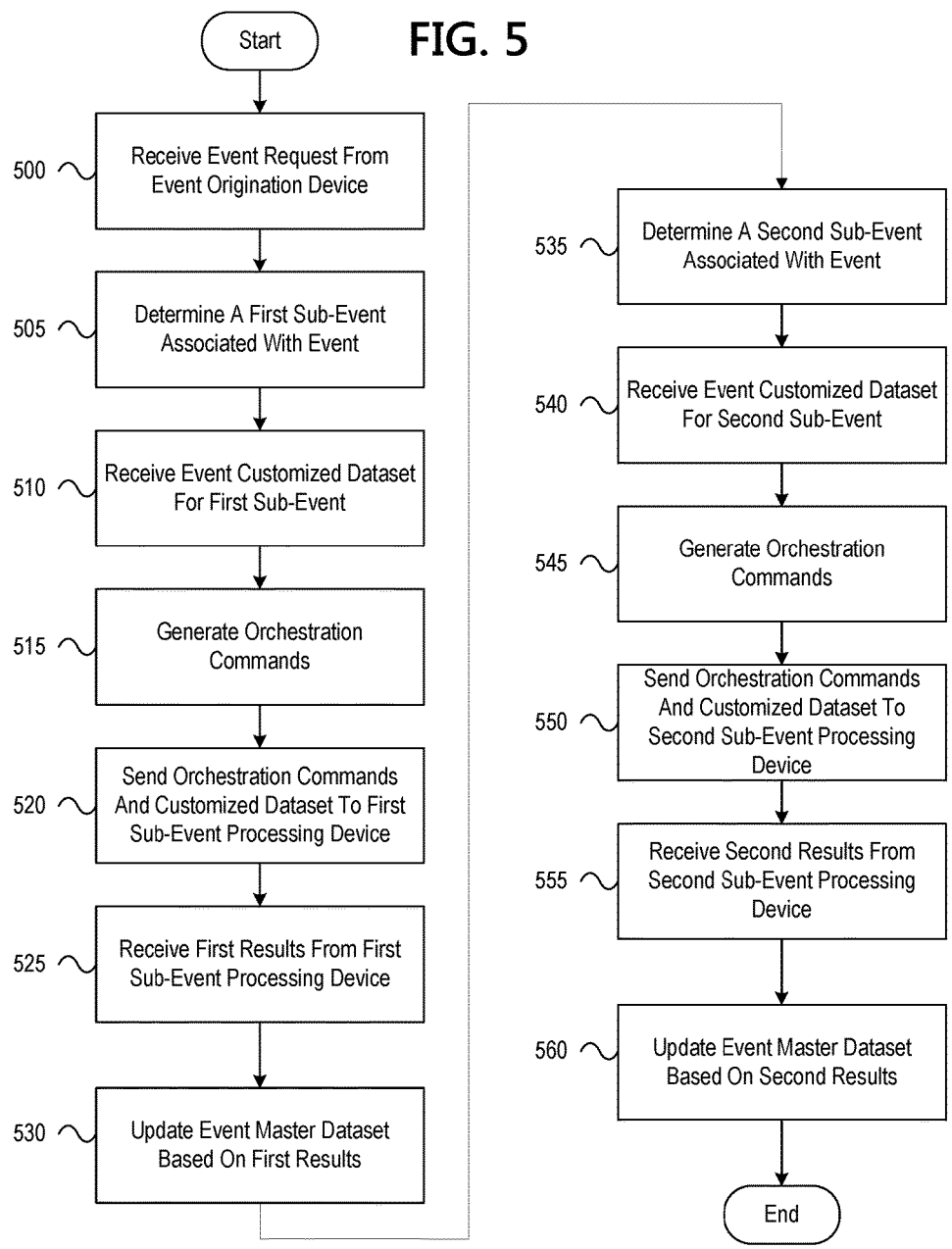

1

MULTICOMPUTER PROCESSING OF AN EVENT REQUEST FROM AN EVENT ORIGINATION DEVICE WITH CENTRALIZED EVENT ORCHESTRATION

BACKGROUND

Aspects of the disclosure relate to electrical computers, digital processing systems, and multicomputer data transferring. In particular, one or more aspects of the disclosure relate to multicomputer processing of an event request from an event origination device with centralized event orchestration.

As computer systems are increasingly utilized to provide automated and electronic services, execution of these services may require increasingly complex coordination between the computer systems, and ensuring timely and accurate coordination may be increasingly important. In many instances, however, it may be difficult to implement and execute the coordinated data flows for the services between the computing systems while also optimizing the efficient and effective technical operations of the computer systems that provide such automated and electronic services.

SUMMARY

Aspects of the disclosure provide effective, efficient, scalable, and convenient technical solutions that address and overcome the technical problems associated with coordinating complex event data flows and event data management between computer systems, and optimizing the efficient and effective technical operations of computer systems. In particular, one or more aspects of the disclosure provide techniques for processing an event request from an event origination device using multicomputer processing and centralized event orchestration to improve data management and enhance technical performance.

In accordance with one or more embodiments, a computing platform having at least one processor, a memory, and a communication interface may receive, via the communication interface, from a first event origination device, a first event request for a first event. Then, the computing platform may determine a first sub-event associated with the first event. Subsequently, the computing platform may receive, via the communication interface, from an event dataset customization engine, a first customized dataset generated for the first sub-event. Thereafter, the computing platform may generate, based on the first sub-event associated with the first event received from the first event origination device, one or more first event orchestration commands directing a first sub-event processing device to execute the first sub-event. Subsequently, the computing platform may send, via the communication interface, to the first sub-event processing device, the first customized dataset and the one or more first event orchestration commands directing the first sub-event processing device to execute the first sub-event. Then, the computing platform may receive, via the communication interface, from the first sub-event processing device, a first results dataset. Thereafter, the computing platform may update, based on the first results dataset, the first master event dataset associated with the first event.

In some embodiments, determining the first sub-event may include determining a first event type of the first event, accessing, in an event protocol database, a first event protocol of the first event type, and determining the first sub-event based on contents of the first event protocol. In some instances, the computing platform may, prior to determining the first sub-event associated with the first event, send a command to the event dataset customization engine to generate the first master event dataset within the event dataset customization engine. In some instances, the first customized dataset may be generated based in part on the first master event dataset.

In some embodiments, the computing platform may validate contents of the first event request with input data requirements specified by the first event protocol.

In some embodiments, the computing platform may validate contents of the first results dataset with output data requirements specified for the first sub-event within the first event protocol.

In some embodiments, the computing platform may determine a second sub-event associated with the first event. Then, the computing platform may receive, via the communication interface and from an event dataset customization engine, a second customized dataset generated for the second sub-event. Thereafter, the computing platform may generate, based on the second sub-event for the first event received from the first event origination device, one or more second event orchestration commands directing a second sub-event processing device to execute the second sub-event. Subsequently, the computing platform may send, via the communication interface and via an external event processing interface, to the second sub-event processing device, the second customized dataset and the one or more second event orchestration commands directing the second sub-event processing device to execute the second sub-event. Then, the computing platform may receive, via the communication interface and via the external event processing interface, from the second sub-event processing device, a second results dataset. Thereafter, the computing platform may update, based on the second results dataset, the first master event dataset associated with the first event.

In some embodiments, determining the second sub-event may include accessing, in the event protocol database, the first event protocol of the first event type, and determining the second sub-event based on contents of the first event protocol.

In some embodiments, the computing platform may validate contents of the second results dataset with output data requirements specified for the second sub-event within the first event protocol.

In some embodiments, the computing platform may receive, via the communication interface, from a second event origination device, a second event request defining a second event. Then, the computing platform may determine a second sub-event associated with the second event and receive, via the communication interface, and from the event dataset customization engine, a second customized dataset generated for the second sub-event associated with the second event. Thereafter, the computing platform may generate, based on the second sub-event associated with the second event received from the second event origination device, one or more second event orchestration commands directing a second sub-event processing device to execute the second sub-event. Subsequently, the computing platform may send, via the communication interface, to the second sub-event processing device, the second customized dataset and the one or more second event orchestration commands directing the second sub-event processing device to execute the second sub-event. Then, the computing platform may receive, via the communication interface, from the second sub-event processing device, a second results dataset. Thereafter, the computing platform may update, based on the second results dataset, a second master event dataset associated with the second event.

In some embodiments, determining the second sub-event may include determining a second event type of the second event, accessing, in an event protocol database, a second event protocol of the second event type, and determining the second sub-event based on contents of the second event protocol. In some instances, the computing platform may, prior to determining the second sub-event associated with the second event, send a command to the event dataset customization engine to generate the second master event dataset within the event dataset customization engine. In some instances, the second customized dataset may be generated in part on the second mater event dataset.

In some embodiments, the computing platform may validate contents of the second event request with input data requirements specified by the second event protocol.

In some embodiments, the computing platform may validate contents of the second results dataset with output data requirements specified for the second sub-event within the second event protocol.

In some embodiments, the computing platform may determine a third sub-event associated with the second event. Thereafter, the computing platform may receive, via the communication interface and from the event dataset customization engine, a third customized dataset generated for the third sub-event. Then, the computing platform may generate, based on the third sub-event associated with the second event received from the second event origination device, one or more third event orchestration commands directing a third sub-event processing device to execute the third sub-event. Subsequently, the computing platform may send, via the communication interface and via an external event processing interface, to the third sub-event processing device, the third customized dataset and the one or more third event orchestration commands directing the third sub-event processing device to execute the third sub-event. Thereafter, the computing platform may receive, via the communication interface and via the external event processing interface, from the third sub-event processing device, a third results dataset. Then, the computing platform may update, based on the third results dataset, the second master event dataset associated with the second event. In some instances, determining the third sub-event may include accessing, in the event protocol database, the second event protocol of the second event type and determining the third sub-event based on contents of the second event protocol.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for multicomputer processing of an event request from an event origination device with centralized event orchestration in accordance with one or more example embodiments;

FIG. 5 depicts an illustrative method for multicomputer processing of an event request from an event origination device with centralized event orchestration in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to orchestrating, in response to receiving an event orchestration request to orchestrate an event, execution of a sequence of sub-events between one or more independent computing systems. The event orchestration request may be received from a computing device within a financial institution, or from an external computing device associated with an organization, such as a treasury client of a financial institution, or by an individual, such as a customer of a financial institution. The data processing capabilities of each of the one or more independent computing systems may vary. Accordingly, a master event dataset may be created for the event, and individual customized datasets may be generated and transmitted to each of the one or more independent computing systems. Each of the one or more independent computing devices may then execute one or more sub-events using a customized dataset.

Figure 1A:
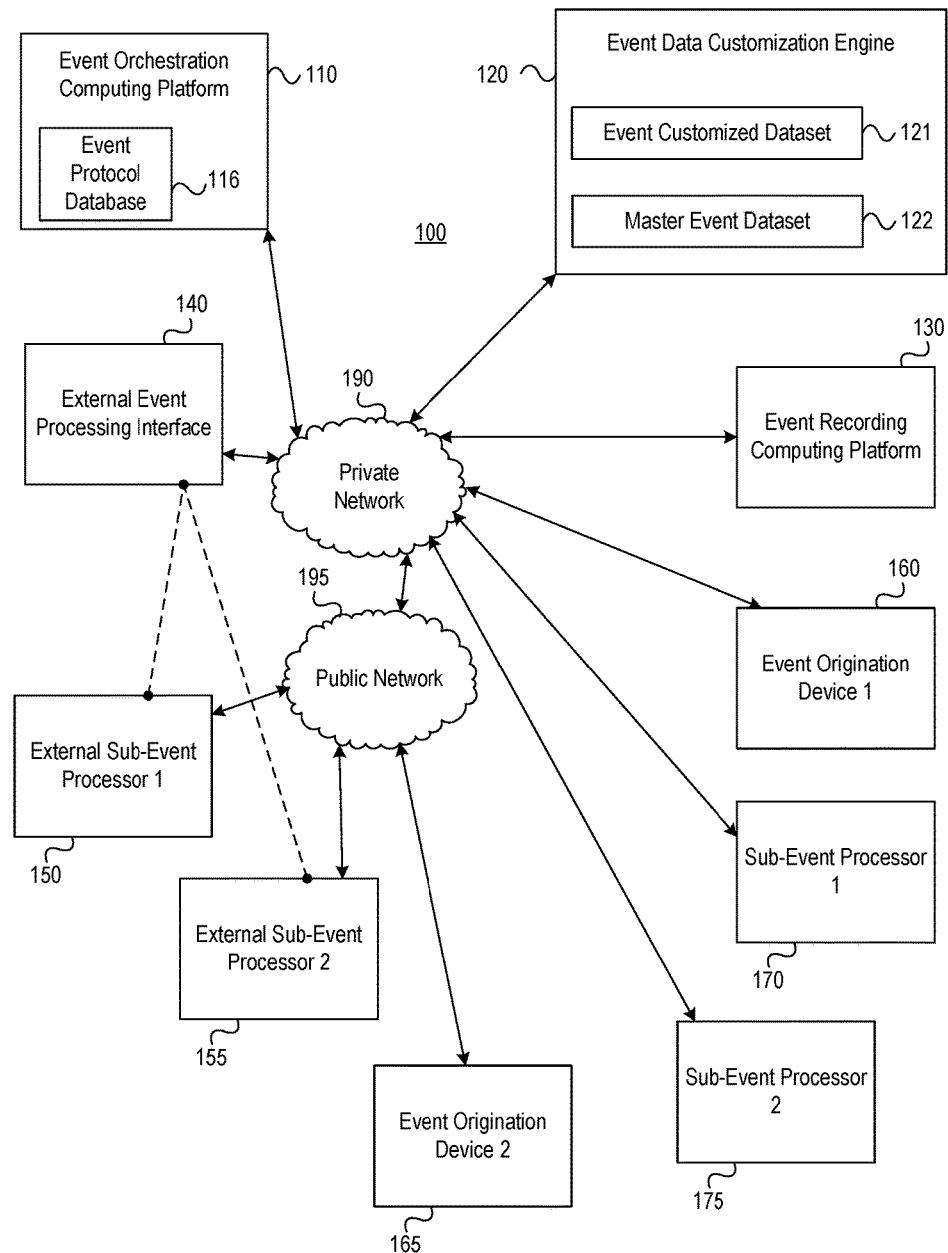
FIGS. 1A and 1B depict an illustrative computing environment for multicomputer processing of an event request from an event origination device with centralized event orchestration in accordance with one or more example embodiments.
Figure 1B:
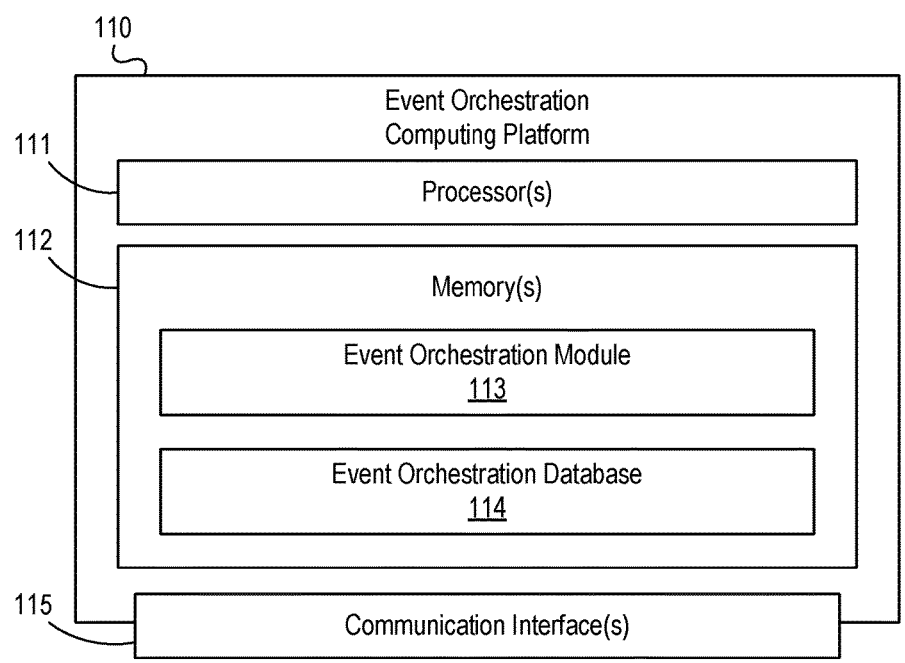

FIGS. 1A and 1B depict an illustrative computing environment for multicomputer processing of an event request from an event origination device with centralized event orchestration in accordance with one or more example embodiments. Referring to FIG. 1A, computing environment 100 may include one or more computing devices and/or other computer systems. For example, computing environment 100 may include an event orchestration computing platform 110, an event dataset customization engine 120, an event recording computing platform 130, an external event processing interface 140, a first external sub-event processor 150, a second external sub-event processor 155, a first event origination device 160, a second event origination device 165, a first sub-event processor 170, and a second sub-event processor 175.

Event orchestration computing platform 110 may be configured to orchestrate events that are defined and/or requested by one or more event origination devices, control and/or direct actions of other devices and/or computer systems (e.g., in orchestrating events that are defined and/or requested by one or more event origination devices and/or in performing other actions), and/or perform other functions, as discussed in greater detail below. Event orchestration computing platform 110 may include event protocol database 116. Event orchestration computing platform 110 may be configured to orchestrate a plurality of different types of events. Each type of event may be associated with an event protocol comprising a specific sequence of sub-events, and different rules and/or parameters for the event and/or one or more sub-events of the event. Event orchestration computing platform 110 may store each of these event protocols in event protocol database 116.

Event dataset customization engine 120 may be configured to generate one or more event customized datasets 121 that are provided to other computer systems and/or devices in computing environment 100, including external event processing interface 140, external sub-event processor 150, external sub-event processor 155, sub-event processor 170, and sub-event processor 175. Event dataset customization engine 120 may further be configured to generate, for each event orchestrated by event orchestration computing platform 110, a master event dataset 122. Each master event dataset 122 stored in event dataset customization engine 120 may adhere to a universal event standard. The standard and/or format of each event customized dataset 121 may vary based on the capabilities of the computing device (i.e. sub-event processor 170, sub-event processor 175, external sub-event processor 150, and/or external sub-event processor 155) that will be utilizing that event customized dataset. In some instances, the one or more customized datasets that are generated by event dataset customization engine 120 may be served to such other computer systems and/or devices by event orchestration computing platform 110, as illustrated in greater detail below. Event recording computing platform 130 may be configured to store, maintain, and/or update one or more records associated with one or more events occurring in computing environment 100, including one or more events orchestrated by event orchestration computing platform 110 and/or otherwise associated with event orchestration computing platform 110.

External event processing interface 140 may be configured to facilitate processing of one or more events that are orchestrated by event orchestration computing platform 110 and/or otherwise associated with event orchestration computing platform 110 and that may be performed by and/or involve one or more external sub-event processors, such as external sub-event processor 150 and external sub-event processor 155. For example, event orchestration computing platform 110 may be operated by and/or otherwise associated with a particular organization (e.g., a financial institution) and may, in some instances, be configured to orchestrate and/or control one or more events (e.g., financial transactions such as a payment and/or a transfer of currency). In addition, external sub-event processor 150 and external sub-event processor 155 may, for example, be operated by and/or otherwise associated with one or more other organizations (e.g., payment processors, credit networks, debit networks, digital wallet services, and/or the like) different from the particular organization operating event orchestration computing platform 110 (e.g., different from the financial institution operating event orchestration computing platform 110). In some instances, external event processing interface 140 may be provided with and/or include one or more dedicated communication links and/or dedicated communication channels, which may directly and/or securely connect external event processing interface 140 to the one or more external event processors, including external sub-event processor 150 and/or external sub-event processor 155.

External sub-event processor 150 may be operated by and/or configured to process events associated with a first service provider or entity, such as a payment processor, a credit network, a debit network, a digital wallet service, and/or the like. External sub-event processor 155 may be operated by and/or configured to process events associated with a second service provider or entity, such as a payment processor, a credit network, a debit network, a digital wallet service, and/or the like, different from the first service provider. Alternatively, external sub-event processor 150 and external sub-event processor 155 may both be operated by and/or configured to process events associated with a same service provider or entity. Event origination device 160 may be configured to be used by an individual associated with an organization, such as an employee of a financial institution. Event origination device 165 may be configured to be used by a first customer of an organization, such as a commercial client or treasury client of a financial institution.

In one or more arrangements, event dataset customization engine 120, event recording computing platform 130, external event processing interface 140, external sub-event processor 150, external sub-event processor 155, event origination device 160, event origination device 165, sub-event processor 170, and sub-event processor 175 may be any type of computing device capable of receiving a user interface, receiving input via the user interface, and communicating the received input to one or more other computing devices. For example, event dataset customization engine 120, event recording computing platform 130, external event processing interface 140, external sub-event processor 150, external sub-event processor 155, event origination device 160, event origination device 165, sub-event processor 170, and sub-event processor 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of event dataset customization engine 120, event recording computing platform 130, external event processing interface 140, external sub-event processor 150, external sub-event processor 155, event origination device 160, event origination device 165, sub-event processor 170, and sub-event processor 175 may, in some instances, be special-purpose computing devices configured to perform specific functions.

Computing environment 100 also may include one or more computing platforms. For example, and as noted above, computing environment 100 may include event orchestration computing platform 110. As illustrated in greater detail below, event orchestration computing platform 110 may include one or more computing devices configured to perform one or more of the functions described herein. For example, event orchestration computing platform 110 may include one or more computers (e.g., laptop computers, desktop computers, servers, server blades, or the like).

Computing environment 100 also may include one or more networks, which may interconnect one or more of event orchestration computing platform 110, event dataset customization engine 120, event recording computing platform 130, external event processing interface 140, external sub-event processor 150, external sub-event processor 155, event origination device 160, event origination device 165, sub-event processor 170, and sub-event processor 175. For example, computing environment 100 may include private network 190 and public network 195. Private network 190 and/or public network 195 may include one or more sub-networks (e.g., local area networks (LANs), wide area networks (WANs), or the like). Private network 190 may be associated with a particular organization (e.g., a corporation, financial institution, educational institution, governmental institution, or the like) and may interconnect one or more computing devices associated with the organization. For example, event orchestration computing platform 110, event dataset customization engine 120, event recording computing platform 130, external event processing interface 140, event origination device 160, event origination device 165, sub-event processor 170, and sub-event processor 175 may be associated with an organization (e.g., a financial institution), and private network 190 may be associated with and/or operated by the organization, and may include one or more networks (e.g., LANs, WANs, virtual private networks (VPNs), or the like) that interconnect event orchestration computing platform 110, event dataset customization engine 120, event recording computing platform 130, external event processing interface 140, event origination device 160, event origination device 165, sub-event processor 170, and sub-event processor 175 and one or more other computing devices and/or computer systems that are used by, operated by, and/or otherwise associated with the organization. Public network 195 may connect private network 190 and/or one or more computing devices connected thereto (e.g., event orchestration computing platform 110, event dataset customization engine 120, event recording computing platform 130, external event processing interface 140, event origination device 160, event origination device 165, sub-event processor 170, and sub-event processor 175) with one or more networks and/or computing devices that are not associated with the organization. For example, external sub-event processor 150, external sub-event processor 155, and event origination device 165 might not be associated with an organization that operates private network 190 (e.g., because external sub-event processor 150, external sub-event processor 155, and event origination device 165 may be owned, operated, and/or serviced by one or more entities different from the organization that operates private network 190, such as one or more customers of the organization and/or vendors of the organization, rather than being owned and/or operated by the organization itself or an employee or affiliate of the organization), and public network 195 may include one or more networks (e.g., the internet) that connect external sub-event processor 150, external sub-event processor 155, and event origination device 165 to private network 190 and/or one or more computing devices connected thereto (e.g., event orchestration computing platform 110, event dataset customization engine 120, event recording computing platform 130, external event processing interface 140, event origination device 160, event origination device 165, sub-event processor 170, and sub-event processor 175).

Referring to FIG. 1B, event orchestration computing platform 110 may include one or more processors 111, memory 112, and communication interface 115. A data bus may interconnect processor(s) 111, memory 112, and communication interface 115. Communication interface 115 may be a network interface configured to support communication between event orchestration computing platform 110 and one or more networks (e.g., private network 190, public network 195, or the like). Memory 112 may include one or more program modules having instructions that when executed by processor(s) 111 cause event orchestration computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event orchestration computing platform 110 and/or by different computing devices that may form and/or otherwise make up event orchestration computing platform 110. For example, memory 112 may have, store, and/or include an event orchestration module 113 and an event orchestration database 114. Event orchestration module 113 may have instructions that direct and/or cause event orchestration computing platform 110 to orchestrate one or more events involving one or more other computing devices and/or computer systems in computing environment 100 and/or perform other functions, as discussed in greater detail below. Event orchestration database 114 may store information used by event orchestration module 113 and/or event orchestration computing platform 110 in orchestrating one or more events involving one or more other computing devices and/or computer systems in computing environment 100 and/or in performing other functions. For example, event orchestration database 114 may store, in part, one or more event customized datasets and one or more master event datasets.

Figure 2A:
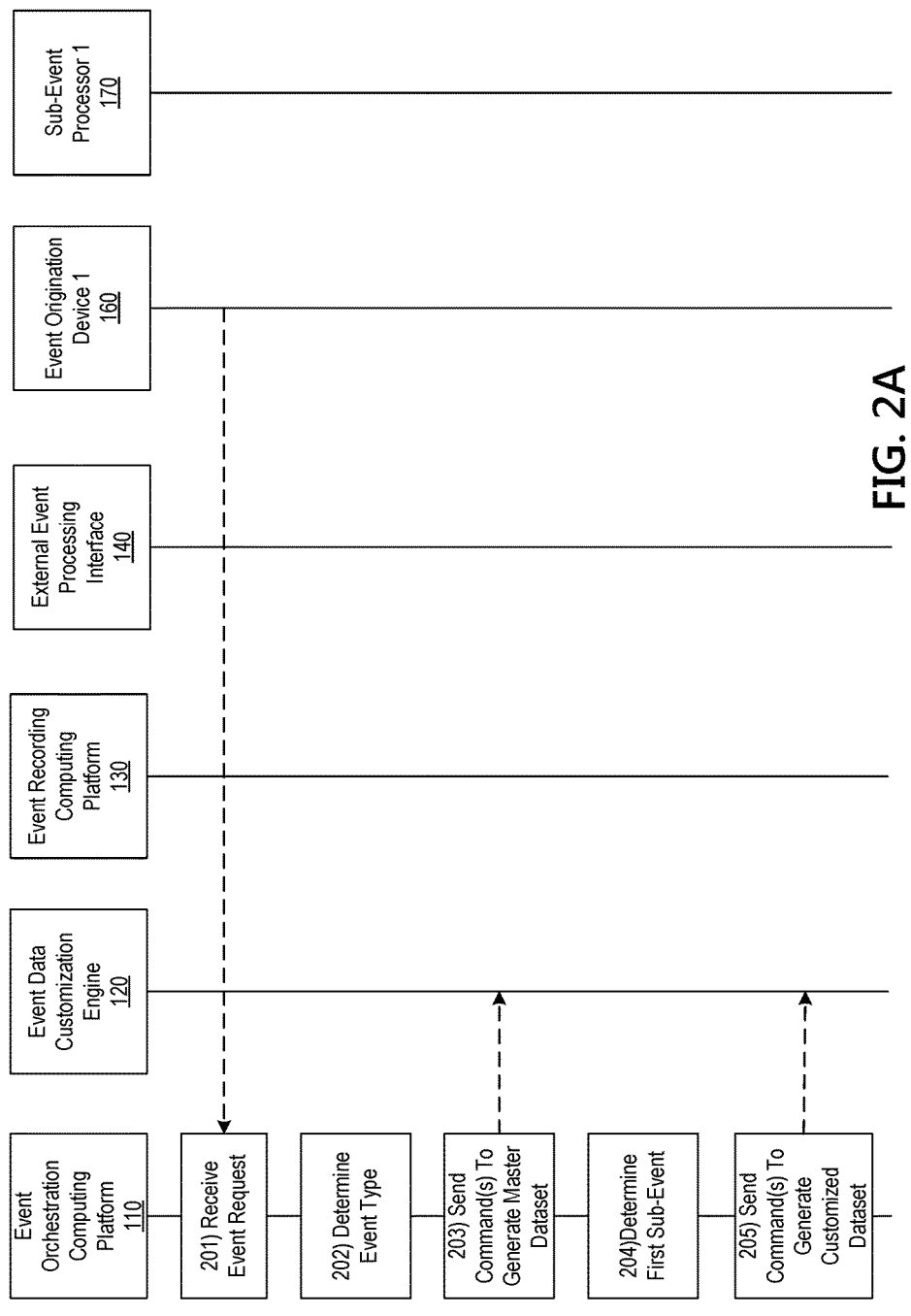

FIGS. 2A-2H depict an illustrative event sequence for multicomputer processing of an event request from an event origination device with centralized event orchestration in accordance with one or more example embodiments. Referring to FIG. 2A, at step 201, event orchestration computing platform 110 may receive a first event request from event origination device 160 to orchestrate a first event. For example, at step 201, event orchestration computing platform 110 may receive a message from event origination device 160 requesting the orchestration of a first event by event orchestration computing platform 110. In one example, the first event may be a financial transaction event, such as a payment or a transferal of currency. The first event request may include one or more associated event parameters. For example, the first event request may specify an event type parameter associated with the first event, an event date parameter associated with the first event, an event occurrence parameter associated with the first event, and additional relevant parameters. The event date parameter may specify the date on which event orchestration computing platform 110 is to commence orchestration of the first event. The event occurrence parameter may specify whether orchestration of the first event is to occur on a one-time basis or on a repeated basis. If orchestration of the first event is to occur on a repeated basis, the event occurrence parameter may specify the frequency for which the first event is to be orchestrated (i.e. daily, weekly, monthly, and the like). The first event request may further include one or more datasets needed for orchestration of the first event. For example, the first event request may include information specifying one or more sources of data for orchestration of the first event (such as one or more financial accounts and/or computing systems) and one or more destinations of data for orchestration of the first event (such as one or more financial accounts and/or computing systems).

Figure 3:
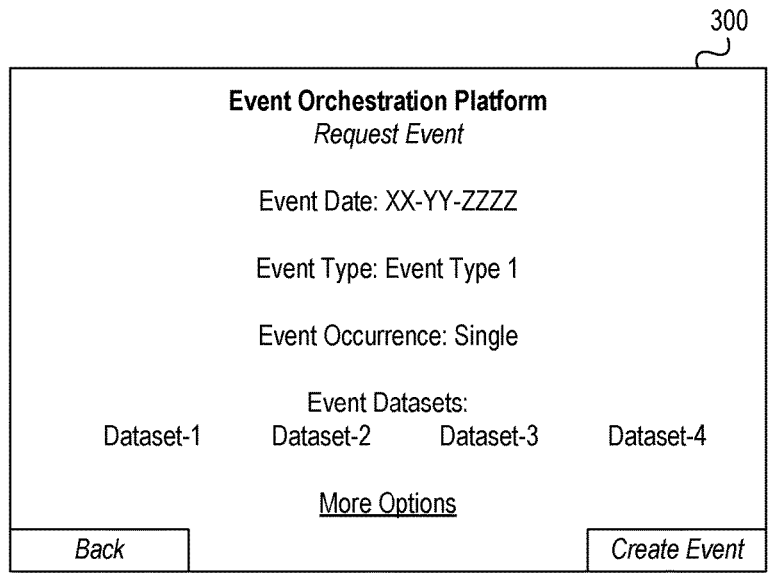
FIGS. 3-4 depict example graphical user interfaces for multicomputer processing of an event request from an event origination device with centralized event orchestration in accordance with one or more example embodiments.

In one example, event orchestration computing platform 110 may receive the first event request from a user interface presented on event origination device 160. An example of a graphical user interface that may be displayed on event origination device 160 for the purposes of generating and transmitting event requests is shown in FIG. 3. As seen in FIG. 3, graphical user interface 300 may include one or more fields, controls, and/or other elements that may allow a user of event origination device 160 to define a new event, such as a financial transaction, to be orchestrated by event orchestration computing platform 110. For example, graphical user interface 300 may include one or more fields, controls, and/or other elements that may allow a user of event origination device 160 to specify and/or otherwise define an event date parameter associated with the event, an event type parameter associated with the event, an event occurrence parameter associated with the event, and/or other parameters associated with the event. In addition, and as seen in FIG. 3, graphical user interface 300 may include one or more fields, controls, and/or other elements that may allow a user of event origination device 160 to include datasets to be used by event orchestration computing platform 110 in orchestrating the event. In one example, a user of graphical user interface 300 may enter the datasets directly into graphical user interface 300, and the datasets themselves may be transmitted in the event request. In another example, a user of graphical user interface 300 may specify the location(s) of one or more datasets to be utilized by event orchestration computing platform 110. Event orchestration computing platform 110 may then access the dataset(s) at the specified location(s) during the orchestration of the event. Specifying the location(s) of the dataset(s) may eliminate the need to transmit large amounts of data over the communication channels between event origination device 160 and event orchestration computing platform 110.

Returning to FIG. 2A, at step 202, event orchestration computing platform 110 may determine the event type of the first event. As discussed above in reference to FIG. 3, an event type parameter may be included in the event request. Event orchestration computing platform 110 may determine the event type by extracting the event type parameter from the received event request. For example, at step 202, event orchestration computing platform 110 may determine that the first event is associated with a first event type.

Responsive to determining the event type for the first event, event orchestration computing platform 110 may validate the contents of the first event request received from event origination device 160. Event orchestration computing platform 110 may include an event protocol database 116 that stores a different set of protocols for each different type of event that may be orchestrated by event orchestration computing platform 110. Each event protocol may include a specification of the data that must be included in an event request to orchestrate events of that event type. For example, the first event protocol for the first event type may include a specification of the datasets that must be included in an event request for orchestration of an event of the first event type. Event orchestration computing platform 110 may validate the first event request by comparing the dataset(s) in the first event request to the dataset(s) specified in the first event protocol. If the event orchestration computing platform 110 successfully validates the first event request (i.e. the first event request includes the dataset(s) specified in the first event protocol for the first event type), event orchestration computing platform 110 may proceed to the next step. If event orchestration computing platform 110 determines that one or more required datasets have been omitted in the event request, event orchestration computing platform 110 may send a notification to event origination device 160 indicating that the first event request cannot be completed. Alternatively, if event orchestration computing platform 110 determines that one or more required datasets have been omitted in the event request, event orchestration computing platform 110 may send a request for the omitted data to event origination device 160. Once event orchestration computing platform 110 receives the omitted data from event origination device 160, event orchestration computing platform 110 may proceed to the next step.

At step 203, event orchestration computing platform 110 may transmit one or more commands to event dataset customization engine 120. The one or more commands may instruct event dataset customization engine 120 to generate a master event dataset for the first event. As noted above, event orchestration computing platform 110 may include an event protocol database 116 that stores a different set of protocols for each different type of event that may be orchestrated by event orchestration computing platform 110. Each event protocol may include, in part, a framework for the master event dataset that is to be generated for each event request for an event of the event type corresponding to that event protocol. The framework may enumerate one or more parameters and/or datasets to be created within the master event dataset.

For example, event orchestration computing platform 110 may be configured to orchestrate at least two different event types, a first illustrative event type and a second illustrative event type. The first illustrative event type may be associated with a first illustrative event protocol (including a first illustrative framework for a master event dataset) within event protocol database 116 and the second illustrative event type may be associated with a second illustrative event protocol (including a second illustrative framework for a master event dataset) within event protocol database 116. Event orchestration computing platform 110 may receive a first illustrative request to orchestrate a first illustrative event and a second illustrative request to orchestrate a second illustrative event. In a first instance, the first illustrative event and the second illustrative event may both be of the first illustrative event type. Accordingly, in the first instance, event orchestration computing platform 110 may utilize contents of the first illustrative framework specified in the first illustrative event protocol for the first illustrative event type to generate one or more commands instructing event dataset customization engine 120 to generate a first illustrative master dataset for the first illustrative event. Further in the first instance, event orchestration computing platform 110 may utilize contents of the first illustrative framework specified in the first illustrative event protocol for the first illustrative event type to generate one or more commands instructing event dataset customization engine 120 to generate a second illustrative master dataset for the second illustrative event. In a second instance, the first illustrative event may be of the first illustrative event type and the second illustrative event may be of the second illustrative event type. Accordingly, in the second instance, event orchestration computing platform 110 may utilize contents of the first illustrative framework specified in the first illustrative event protocol for the first illustrative event type to generate one or more commands instructing event dataset customization engine 120 to generate a first illustrative master dataset for the first illustrative event. Further in the second instance, event orchestration computing platform 110 may utilize contents of the second illustrative framework specified in the second illustrative event protocol for the second illustrative event type to generate one or more commands instructing event dataset customization engine 120 to generate a second illustrative master dataset for the second illustrative event.

Therefore, to generate the one or more commands to be transmitted to event dataset customization engine 120 for the first event in the first event request received at step 201, event orchestration computing platform 110 may access a first event protocol associated with the first event type determined at step 202. Event orchestration computing platform 110 may then generate the one or more commands based on a first framework for the event master dataset specified in the first event protocol. For example, the one or more commands generated by event orchestration computing platform 110 may include the parameters and/or datasets enumerated in the first framework for the event master dataset. Alternatively, the one or more commands may include a storage location of the first event protocol (or the first framework for the master event dataset) for the first event type so that event dataset customization engine 120 may directly access the first framework when subsequently generating the master event dataset for the first event.

At step 204, event orchestration computing platform 110 may determine a first sub-event associated with the first event. As noted above, event orchestration computing platform 110 may include an event protocol database 116 that stores a different set of protocols for each different type of event that may be orchestrated by event orchestration computing platform 110. Each event protocol may include, in part, a sequence of sub-events that are to be executed in order to complete orchestration of an event of the event type associated with that event protocol. For example, the first event protocol for the first event type may specify a first sequence of sub-events that are to be executed for each event of the first event type. Each sub-event of the first sequence may be executed by a different sub-event processor (i.e. sub-event processor 170, sub-event processor 175, external sub-event processor 150, external sub-event processor 155.) To determine the first sub-event associated with the first event, event orchestration computing platform 110 may access the first event protocol associated with the first event type, and subsequently identify the first sub-event listed in the first sequence of sub-events. For example, the first event may be a payment transaction, and the first sub-event may be unauthorized use analysis of the payment, sanctions analysis of the payment, a clearing of the payment, a settlement of funds associated with the payment, and the like.

At step 205, event orchestration computing platform 110 may send one or more commands to event dataset customization engine 120 to generate a customized dataset to be utilized for execution of the first sub-event. As noted above, each event protocol may include, in part, a sequence of sub-events that are to be executed in order to complete orchestration of an event of the event type associated with that event protocol. Each event protocol may further include one or rules for each sub-event in the sequence of sub-events. For each sub-event, the rules may specify the computing device that is to execute the sub-event. For each sub-event, the rules may further specify one or more command(s) to be sent to the computing device that is to execute the sub-event. For each sub-event, the rules may further specify the contents of a customized dataset that is to be utilized by the computing device when executing the sub-event. The contents of the customized dataset may be determined based on the data requirements for the sub-event and the capabilities of the computing device that is to execute the sub-event. For example, the rules for the first sub-event identified in step 204 may indicate that the first sub-event is to be executed by sub-event processor 170. The rules may further specify that execution of the first sub-event only requires a first subset of the data stored in the first master event dataset generated for the first event. It may be advantageous to transmit only the required data (i.e. the first subset of data) to sub-event processor 170 to reduce network traffic (i.e. bandwidth usage). Additionally, in one example, sub-event processor 170 may be a legacy computing system. In this case, it may be necessary to convert the first subset of data into a different format that may be processed by sub-event processor 170. Accordingly, event orchestration computing platform 110 may generate one or more commands instructing event dataset customization engine 120 to generate a first event customized dataset for the first sub-event that includes the first subset of data from the master event dataset stored in event dataset customization engine 120 for the first event. Additionally, event orchestration computing platform 110 may generate one or more commands instructing event dataset customization engine 120 to further convert the first subset of data into a specified format (i.e. a format that may be utilized by sub-event processor 170 when executing the first sub-event). Event orchestration computing platform 110 may then send the generated one or more commands to event dataset customization engine 120.

Referring to FIG. 2B, at step 206, event orchestration computing platform 110 may receive the first event customized dataset for the first sub-event from event dataset customization engine 120. Event dataset customization engine 120 may have generated the first event customized dataset for the first sub-event by extracting the requested first subset of data from the first event master dataset generated for the first event. Event dataset customization engine 120 may then have performed the conversion of the first subset data to the format required by sub-event processor 170 or may have utilized a separate conversion engine (not shown). Alternatively, event orchestration computing platform 110 may receive the storage location of the first event customized dataset for the first sub-event from event dataset customization engine 120.

At step 207, event orchestration computing platform 110 may send one or more event orchestration commands and supplementary data to sub-event processor 170. For example, event orchestration computing platform 110 may sent one or more event orchestration commands specified in the rules for the first sub-event in the first event protocol and the first event customized dataset for the first sub-event to sub-event processor 170. The one or more event orchestration commands may be generated based on the commands specified in the rules for the first sub-event in the first event protocol. In one scenario, event orchestration computing platform 110 may send the storage location of the supplementary data to sub-event processor 170 in place of sending the supplementary data in its entirety. For example, event orchestration computing platform 110 may send the storage location of the first event customized dataset for the first sub-event to sub-event processor 170. Sending the storage location of the first event customized dataset for the first sub-event instead of the first event customized dataset for the first sub-event in its entirety reduces the traffic sent on the communication channels between event orchestration computing platform 110 and sub-event processor 170 and thus provides technical benefits and operational advantages.

At step 208, event orchestration computing platform 110 may receive a first results dataset from sub-event processor 170. For example, event orchestration computing platform 110 may receive a first results dataset from sub-event processor 170 that may include data generated by sub-event processor 170 during, or as a result of, execution of the first sub-event. At step 209, event orchestration computing platform 110 may validate the first results dataset received from sub-event processor 170. In validating the first results dataset, event orchestration computing platform 110 may access the one or more rules defined for the first sub-event within the first event protocol associated with the first event type. The one or more rules defined for the first sub-event may include information defining the data that is to be received from the sub-event processor 170 as a result of the sub-event processor 170 executing the first sub-event. Event orchestration computing platform 110 may compare the information in the one or more rules to the first results dataset received from the sub-event processor 170. If the validation indicates that the correct data is included in the first results dataset, event orchestration computing platform 110 may proceed to the next step. If there is an error within the first results dataset, event orchestration computing platform 110 may transmit a notification to sub-event processor 170 indicating that the first sub-event should be re-executed by sub-event processor 170. Alternatively, event orchestration computing platform 110 may transmit a request for the omitted data to sub-event processor 170.

Turning to FIG. 2C, at step 210, event orchestration computing platform 110 may update the first event master dataset generated for the first event. For example, event orchestration computing platform 110 may update the first event master dataset generated for the first event based on the data in the validated first results dataset. If the first results dataset includes updated values for parameters already stored in the first event master dataset, event orchestration computing platform 110 may replace the current values of these parameters in the first event master dataset with the updated values. If the first results dataset includes new parameters and values that are not currently in the first event master dataset, these new parameters and values may be added to the first event master dataset.

At step 211, event orchestration computing platform 110 may determine a second sub-event associated with the first event. In determining the second sub-event associated with the first event, event orchestration computing platform 110 may access the first event protocol associated with the first event type (i.e. the event type of the first event). Event orchestration computing platform 110 may identify, within the first event protocol, the second sub-event listed in the first sequence of sub-events. For example, the first event may be a payment transaction, and the second sub-event may be unauthorized use analysis of the payment, sanctions analysis of the payment, a clearing of the payment, a settlement of funds associated with the payment, and the like. In other embodiments, a second sub-event associated with the first event may be determined from the first results dataset. For example, the first results dataset may include an indication of the second sub-event. In another example, the first results dataset may include data directing event orchestration computing platform 110 to a specific sub-event in the first event protocol that is to be executed as the second sub-event. Utilizing data from the first results dataset to determine the second sub-event for the first event allows for a flexible execution of the first event protocol. For example, execution of one or more sub-events in the first event protocol may be bypassed based on the contents of the first results dataset, therefore resulting in an execution of only a subset of the sub-events listed in the first event protocol in certain instances.

At step 212, event orchestration computing platform 110 may send one or more commands to event dataset customization engine 120 to generate a customized dataset to be utilized for execution of the second sub-event associated with the first event. As noted above, each event protocol may include, in part, a sequence of sub-events that are to be executed in order to complete orchestration of each event of that event type. Each of the event protocols may further include one or rules for each sub-event, wherein the rules may specify the computing device that is to execute the sub-event, one or more command(s) to be sent to the computing device that is to execute the sub-event, and the contents of a customized dataset that is to be utilized by the computing device when executing the sub-event. The contents of the customized dataset may be determined based on the data requirements for execution of the sub-event and the capabilities of the computing device that is to execute the sub-event. For example, the rules for the second sub-event identified in step 211 may indicate that the second sub-event associated with the first event is to be executed by external sub-event processor 150. External sub-event processor 150 may be operated by and/or configured to process events associated with a first service provider or entity, such as a payment processor, a credit network, a debit network, a digital wallet service, and/or the like. The rules for the second sub-event associated with the first event may further specify that execution of the second sub-event associated with the first event only requires a second subset of the data stored in the first master event dataset generated for the first event. It may be advantageous to transmit only the required data (i.e. the second subset of data) to external sub-event processor 150 to reduce network traffic (i.e. bandwidth usage) and/or to reduce the amount of data exposed to potential security risks. In one example, external sub-event processor 150 may be a legacy computing system (such as a legacy computing server) or a different type of computing system. In this case, it may be necessary to convert the second subset of data into a different format that may be processed by external sub-event processor 150. Accordingly, event orchestration computing platform 110 may generate one or more commands instructing event dataset customization engine 120 to generate a second event customized dataset for the second sub-event associated with the first event that includes the second subset of data from the first master event dataset stored in event dataset customization engine 120. Event orchestration computing platform 110 may further generate one or more commands instructing event dataset customization engine 120 to convert the second subset of data into a specified format (i.e. a format that may be required by external sub-event processor 150). Event orchestration computing platform 110 may then send the generated one or more commands to event dataset customization engine 120.

At step 213, event orchestration computing platform 110 may receive the second event customized dataset for the second sub-event associated with the first event from event dataset customization engine 120. Event dataset customization engine 120 may have generated the second event customized dataset for the first event by extracting the requested second subset of data from the first event master dataset generated for the first event. Event dataset customization engine 120 may then have performed the conversion of the second subset of data to the format required by external sub-event processor 150 or may have utilized a separate conversion engine (not shown). Alternatively, event orchestration computing platform 110 may receive the storage location of the second event customized dataset for the second sub-event associated with the first event from event dataset customization engine 120.

Figure 2D:
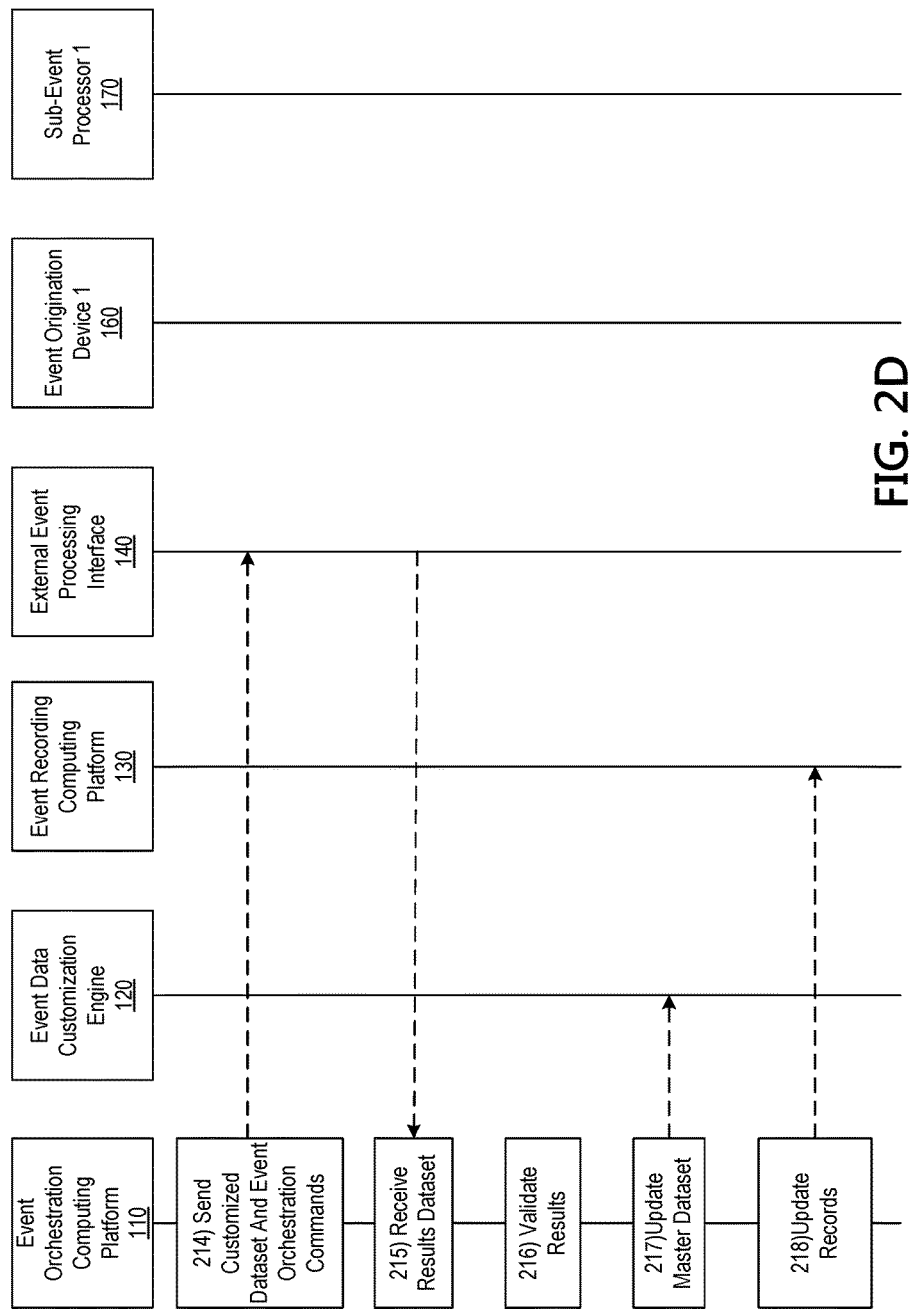

Turning to FIG. 2D, at step 214, event orchestration computing platform 110 may send the second event customized dataset and one or more event orchestration commands specified in the rules for the second sub-event associated with the first event to external sub-event processor 150. For example, event orchestration computing platform 110 may send the second event customized dataset generated for the second sub-event associated with the first event and one or more event orchestration commands specified in the rules for the second sub-event to external sub-event processor 150 via external event processing interface 140. Event orchestration computing platform 110 may generate the one or more event orchestration commands based on the commands specified in the rules for the second sub-event associated with the first event in the first sequence of sub-events in the first event protocol. Alternatively, event orchestration computing platform 110 may send the storage location of the second event customized dataset for the second sub-event associated with the first event to external sub-event processor 150. Sending the storage location of the second event customized dataset instead of the second event customized dataset in its entirety may reduce the traffic sent on the communication channels between event orchestration computing platform 110 and external sub-event processor 150.

At step 215, event orchestration computing platform 110 may receive a second results dataset from external sub-event processor 150. The second results dataset may include data generated by external sub-event processor 150 during, or as a result of, execution of the second sub-event. At step 216, event orchestration computing platform 110 may validate the second results dataset received from external sub-event processor 150. In validating the second results dataset received from external sub-event processor 150, event orchestration computing platform 110 may access the one or more rules defined for the second sub-event associated with the first event within the first event protocol associated with the first event type (i.e. the event type of the first event). The one or more rules defined for the second sub-event associated with the first event may include information defining the data that is to be received from external sub-event processor 150 as a result of external sub-event processor 150 executing the second sub-event associated with the first event. Event orchestration computing platform 110 may compare the information in the one or more rules defined for the second sub-event associated with the first event within the first event protocol associated with the first event type to the second results dataset received from external sub-event processor 150. If the validation indicates that the correct data is included in the second results dataset, event orchestration computing platform 110 may proceed to the next step. If there is an error within the second results dataset, event orchestration computing platform 110 may transmit a notification to external sub-event processor 150 indicating that the second sub-event associated with the first event should be re-executed by external sub-event processor 150. Alternatively, event orchestration computing platform 110 may transmit a request for the omitted data to external sub-event processor 150.

At step 217, event orchestration computing platform 110 may update the first event master dataset generated for the first event. For example, event orchestration computing platform 110 may update the first master generated for the first event based on the data in the validated second results dataset. If the second results dataset includes updated values for parameters that are already in the first event master dataset, event orchestration computing platform 110 may replace the current values of these parameters in the first event master dataset with the updated values. If the second results dataset includes new parameters and values, event orchestration computing platform 110 may add these new parameters and values to the first event master dataset.

At step 218, event orchestration computing platform 110 may update one or more master records associated with the first event. For example, event orchestration computing platform 110 may update one or more master records associated with the first event and stored in event recording computing platform 130 upon determining that orchestration of the first event is complete. Event orchestration computing platform 110 may determine that orchestration of the first event is complete based on the contents of the first event protocol associated with the first event. As noted above, the first event protocol may include a sequence of sub-events that must be executed in order to complete orchestration of events of the first event type, such as the first event. Each of the sub-events in the sequence of sub-events may include one or more rules. The one or more rules of the last sub-event in the sequence of sub-events for the first event protocol may include an indication that once the last sub-event has been executed, no further sub-events need to be executed for events of the first event type. In other embodiments, one or more rules of the last sub-event in the sequence of sub-events for the first event protocol may include an indication that once the last sub-event has been executed, event orchestration of another event is to be triggered, thus resulting in a recursive orchestration of events. Accordingly, once event orchestration computing platform 110 has updated the first event master dataset after execution of the second sub-event, event orchestration computing platform 110 may determine that the second sub-event is the last sub-event in the sequence of sub-events for the first event protocol. Accordingly, event orchestration computing platform 110 may update one or more master records associated with the first event and stored in event recording computing platform 130 to indicate that orchestration of the first event has been completed. Event orchestration computing platform 110 may update the one or more master records associated with the first event and stored in event recording computing platform 130 to further indicate the completion date and/or time of orchestration of the first event. Event orchestration computing platform 110 may update the one or more master records associated with the first event and stored in event recording computing platform 130 to include the contents or storage location of the first event master dataset.

Figure 2E:
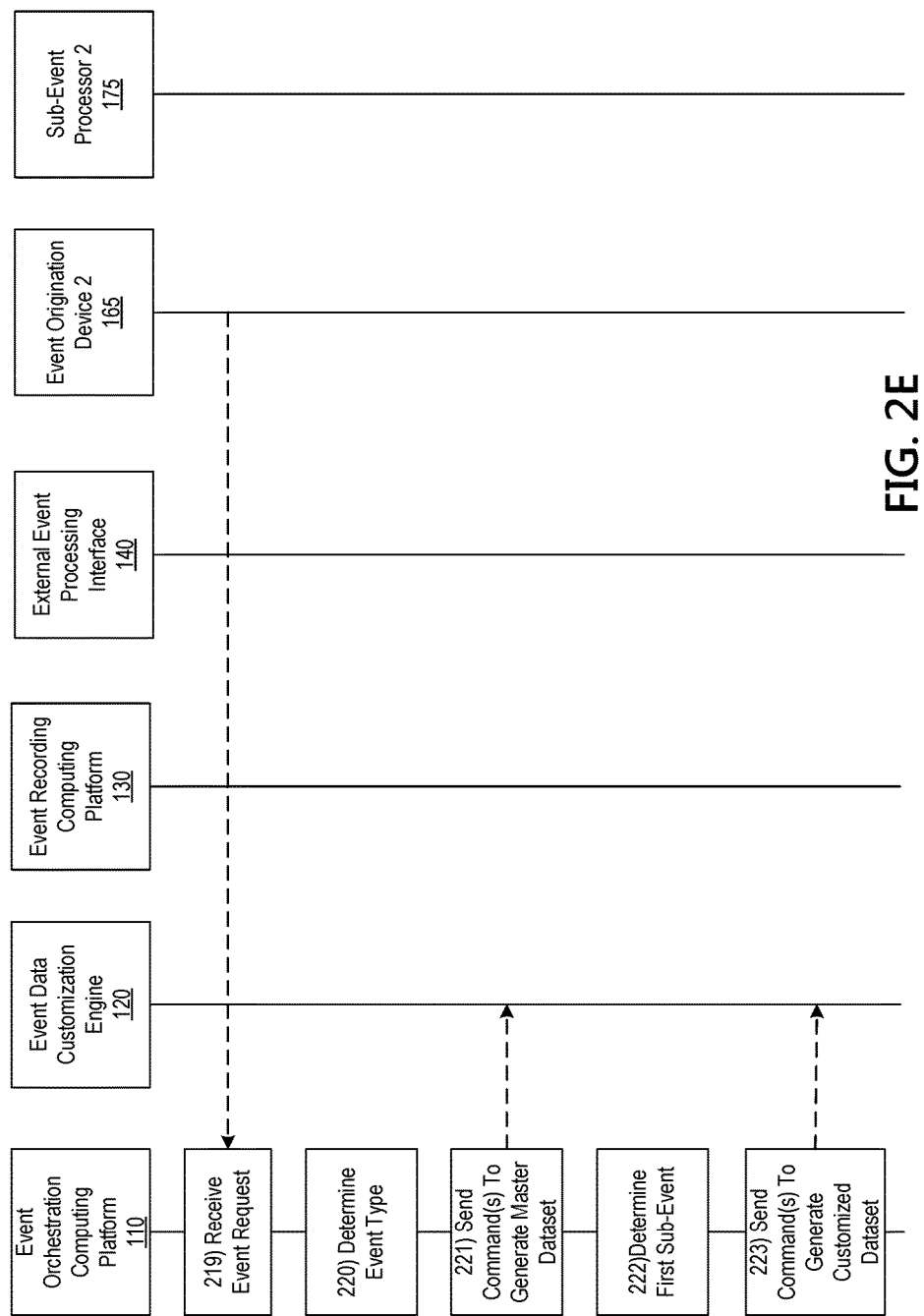

Referring to FIG. 2E, at step 219, event orchestration computing platform 110 may receive a second event request from event origination device 165 to orchestrate a second event. For example, at step 219, event orchestration computing platform 110 may receive a message from event origination device 165 requesting the orchestration of a second event by event orchestration computing platform 110. In one example, the second event may be a financial transaction event. The second event request may include one or more associated event parameters. For example, the second event request may specify an event type parameter associated with the second event, an event date parameter associated with the second event, an event occurrence parameter associated with the second event, and additional relevant parameters. The event date parameter may specify the date on which event orchestration computing platform 110 is to commence orchestration of the second event. The event occurrence parameter may specify whether orchestration of the second event is to occur on a one-time basis or on a repeated basis. If orchestration of the second event is to occur on a repeated basis, the event occurrence parameter may specify the frequency for which the second event is to be orchestrated (i.e. daily, weekly, monthly, and the like). The second event request may further include one or more datasets needed for orchestration of the second event. For example, the second event request may include information specifying one or more sources of data for orchestration of the second event (such as one or more financial accounts and/or computer systems) and one or more destinations of data for orchestration of the second event (such as one or more financial accounts and/or computer systems).

Figure 4:
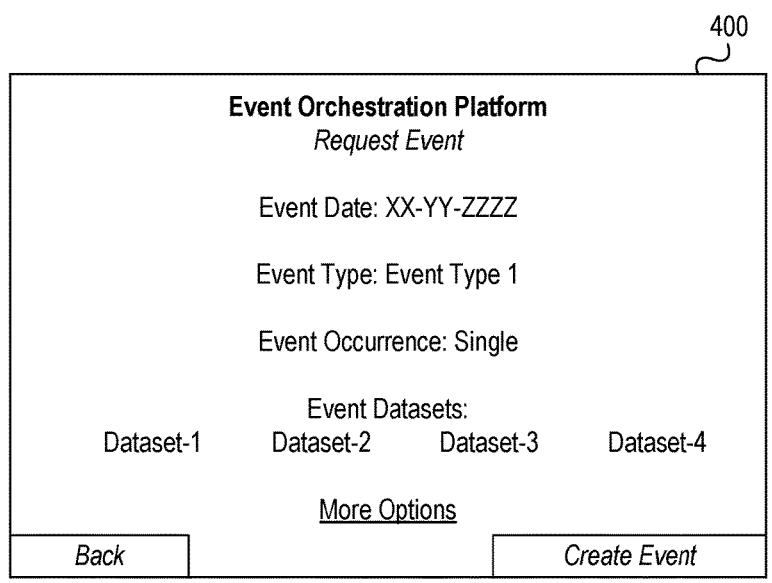

In one example, event orchestration computing platform 110 may receive the second event request from a user interface presented on event origination device 165. An example of a graphical user interface that may be displayed on event origination device 165 for the purposes of generating and transmitting event requests is shown in FIG. 4. As seen in FIG. 4, graphical user interface 400 may include one or more fields, controls, and/or other elements that may allow a user of event origination device 165 to define a new event, such as a financial transaction, to be orchestrated by event orchestration computing platform 110. For example, graphical user interface 400 may include one or more fields, controls, and/or other elements that may allow a user of event origination device 165 to specify and/or otherwise define an event date parameter associated with the event, an event type parameter associated with the event, an event occurrence parameter associated with the event, and/or other parameters associated with the event. In addition, and as seen in FIG. 4, graphical user interface 400 may include one or more fields, controls, and/or other elements that may allow a user of event origination device 165 to include datasets to be used by event orchestration computing platform 110 in orchestrating the event. In one example, a user of graphical user interface 400 may enter the datasets directly into graphical user interface 400, and the datasets themselves may be transmitted in the event request. In another example, a user of graphical user interface 400 may specify the location(s) of one or more datasets to be utilized by event orchestration computing platform 110. Event orchestration computing platform 110 may then access the dataset(s) at the specified location(s) during the orchestration of the event. Specifying the location(s) of the dataset(s) may eliminate the need to transmit large amounts of data over the communication channels between event origination device 165 and event orchestration computing platform 110.

Returning to FIG. 2E, at step 220, event orchestration computing platform 110 may determine the event type of the second event. As discussed above in reference to FIG. 4, an event type parameter may be included in event request received from event origination device 165. Event orchestration computing platform 110 may determine the event type of the second event by extracting the event type parameter from the second event request. For example, at step 220, event orchestration computing platform 110 may determine that the second event is associated with a second event type.

Responsive to determining the event type for the second event, event orchestration computing platform 110 may validate the contents of the second event request received from event origination device 165. As noted above, event orchestration computing platform 110 may include an event protocol database 116 that stores a different event protocol for each different type of event that may be orchestrated by event orchestration computing platform 110. As further noted above, each event protocol may include a specification of the data that must be included in an event request of the corresponding event type. For example, event orchestration computing platform 110 may store a second event protocol that is associated with the second event type. The second event protocol associated with the second event type may include a specification of the datasets that must be included in an event request for orchestration of an event of the second event type. Event orchestration computing platform 110 may validate the second event request by comparing the dataset(s) in the second event request to the dataset(s) specified in the second event protocol. If the event orchestration computing platform 110 successfully validates the second event request (i.e. the second event request includes the dataset(s) specified in the second event protocol for the second event type), event orchestration computing platform 110 may proceed to the next step. If event orchestration computing platform 110 determines that one or more required datasets have been omitted in the second event request, event orchestration computing platform 110 may send a notification to event origination device 165 indicating that the second event request cannot be completed. Alternatively, if event orchestration computing platform 110 determines that one or more required datasets have been omitted in the second event request, event orchestration computing platform 110 may send a request for the omitted data to event origination device 165. Once event orchestration computing platform 110 receives the omitted data from event origination device 165, event orchestration computing platform 110 may proceed to the next step.

At step 221, event orchestration computing platform 110 may transmit one or more commands to event dataset customization engine 120. The one or more commands may instruct event dataset customization engine 120 to generate a second master event dataset for the second event. As indicated above, event orchestration computing platform 110 may include an event protocol database 116 that stores a different event protocol for each different type of event that may be orchestrated by event orchestration computing platform 110. Each event protocol may include, in part, a framework for the master event dataset that is to be generated for each event of the event type associated with that event protocol. Each framework may enumerate one or more parameters and/or datasets to be created within the master event dataset. For example, the second event protocol in event protocol database 116 may store a second framework for a second master event dataset.

Therefore, to generate the one or more commands to be transmitted to event dataset customization engine 120 for the second event in the second event request received at step 219, event orchestration computing platform 110 may access the second event protocol associated with the second event type determined at step 220. Event orchestration computing platform 110 may then generate the one or more commands based on the second framework for the second event master dataset specified in the second event protocol. For example, the one or more commands generated by event orchestration computing platform 110 may include the parameters and/or datasets enumerated in the second framework for the second event master dataset. Alternatively, the one or more commands may include a storage location of the second event protocol (or the second framework for the second master event dataset) for the second event type so that event dataset customization engine 120 may directly access the second framework when subsequently generating the second master event dataset for the second event.

At step 222, event orchestration computing platform 110 may determine a first sub-event associated with the second event. As noted above, event orchestration computing platform 110 may include an event protocol database 116 that stores a different event protocol for each different type of event that may be orchestrated by event orchestration computing platform 110. Each event protocol may include, in part, a sequence of sub-events that are to be executed in order to complete orchestration of an event of the event type associated with that event protocol. For example, the second event protocol for the second event type may specify a second sequence of sub-events that are to be executed for each event of the second event type. Each sub-event of the second sequence may be executed by a different sub-event processor (i.e. sub-event processor 170, sub-event processor 175, external sub-event processor 150, external sub-event processor 155.) To determine the first sub-event associated with the second event, event orchestration computing platform 110 may access the second event protocol associated with the second event type, and subsequently identify the first sub-event listed in the second sequence of sub-events. For example, the second event may be a payment transaction, and the first sub-event of the second event may be unauthorized use analysis of the payment, sanctions analysis of the payment, a clearing of the payment, a settlement of funds associated with the payment, and the like.

At step 223, event orchestration computing platform 110 may send one or more commands to event dataset customization engine 120 to generate a customized dataset to be utilized for execution of the first sub-event of the second event. As noted above, each event protocol may include, in part, a sequence of sub-events that are to be executed in order to complete orchestration of an event of the event type associated with that event protocol. Each event protocol may further include one or rules for each sub-event in the sequence of sub-events. For example, the second sequence of sub-events in second event protocol may include, for each sub-event therein, the computing device that is to execute the sub-event, one or more command(s) to be sent to the computing device that is to execute the sub-event, and the contents of a customized dataset that is to be utilized by the computing device when executing the sub-event. The contents of the customized dataset may be determined based on the data requirements for the sub-event and the capabilities of the computing device that is to execute the sub-event. For example, the rules for the first sub-event of the second event may indicate that the first sub-event of the second event is to be executed by sub-event processor 175. The rules may further specify that execution of the first sub-event of the second event only requires a first subset of the data stored in the second master event dataset generated for the second event. It may be advantageous to transmit only the required data (i.e. the first subset of data) to sub-event processor 175 to reduce network traffic (i.e. bandwidth usage). Additionally, in one example, sub-event processor 175 may be a legacy computing system. In this case, it may be necessary to convert the first subset of data into a different format that may be processed by sub-event processor 175. Accordingly, event orchestration computing platform 110 may generate one or more commands instructing event dataset customization engine 120 to generate a first event customized dataset for the first sub-event of the second event that includes the first subset of data from the second master event dataset stored in event dataset customization engine 120 for the second event. Additionally, event orchestration computing platform 110 may generate one or more commands instructing event dataset customization engine 120 to further convert the first subset of data into a specified format (i.e. a format that may be utilized by sub-event processor 175 when executing the first sub-event of the second event). Event orchestration computing platform 110 may then send the generated one or more commands to event dataset customization engine 120.

Referring to FIG. 2F, at step 224, event orchestration computing platform 110 may receive the first event customized dataset for the first sub-event of the second event from event dataset customization engine 120. Event dataset customization engine 120 may have generated the first event customized dataset for the first sub-event of the second event by extracting the requested first subset of data from the second event master dataset generated for the second event and stored in event dataset customization engine 120. Event dataset customization engine 120 may then have converted the first subset of data into the format required by sub-event processor 175 or may have utilized a separate conversion engine (not shown). Alternatively, event orchestration computing platform 110 may receive the storage location of the first event customized dataset for the first sub-event of the second event from event dataset customization engine 120.

At step 225, event orchestration computing platform 110 may send one or more event orchestration commands and supplementary data to sub-event processor 175. For example, event orchestration computing platform 110 may send one or more event orchestration commands specified in the rules for the first sub-event of the second event in the second event protocol to sub-event processor 175 and may further send the first event customized dataset for the first sub-event of the second event to sub-event processor 175. The one or more event orchestration commands may be generated based on the commands specified in the rules for the first sub-event of the second event in the second event protocol. In one scenario, event orchestration computing platform 110 may send the storage location of the supplementary data to sub-event processor 175 in place of sending the supplementary data in its entirety. For example, event orchestration computing platform 110 may send the storage location of the first event customized dataset for the first sub-event of the second event to sub-event processor 175. Sending the storage location of the first event customized dataset for the first sub-event of the second event instead of the first event customized dataset for the first sub-event of the second event in its entirety reduces the traffic sent on the communication channels between event orchestration computing platform 110 and sub-event processor 175.

At step 226, event orchestration computing platform 110 may receive a first results dataset from sub-event processor 175. For example, event orchestration computing platform 110 may receive a first results dataset from sub-event processor 175 that may include data generated by sub-event processor 175 during, or as a result of, execution of the first sub-event of the second event. At step 227, event orchestration computing platform 110 may validate the first results dataset for the first sub-event of the second event received from sub-event processor 175. In validating the first results dataset for the first sub-event of the second event, event orchestration computing platform 110 may access the one or more rules defined for the first sub-event of the second event within the second event protocol associated with the second event type. The one or more rules defined for the first sub-event of the second event may include information defining the data that is to be received from sub-event processor 175 as a result of the sub-event processor 175 executing the first sub-event of the second event. Event orchestration computing platform 110 may compare the information in the one or more rules to the first results dataset for the first sub-event of the second event received from the sub-event processor 175. If the validation indicates that the correct data is included in the first results dataset for the first sub-event of the second event, event orchestration computing platform 110 may proceed to the next step. If there is an error within the first results dataset for the first sub-event of the second event, event orchestration computing platform 110 may transmit a notification to sub-event processor 175 indicating that the first sub-event of the second event should be re-executed by sub-event processor 175. Alternatively, event orchestration computing platform 110 may transmit a request for the omitted data to sub-event processor 175.

Figure 2G:
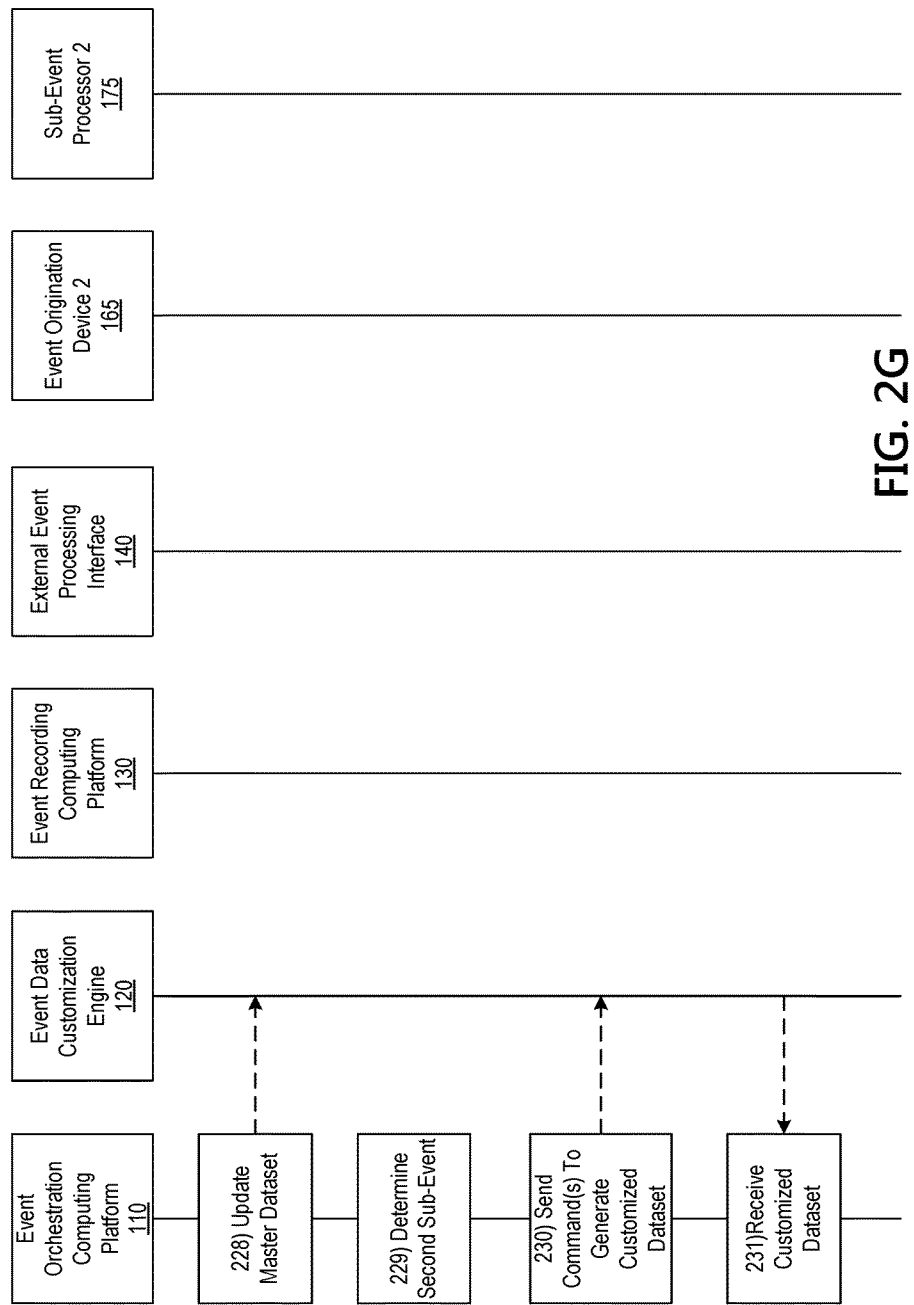

Turning to FIG. 2G, at step 228, event orchestration computing platform 110 may update the second event master dataset generated for the second event. For example, event orchestration computing platform 110 may update the second event master dataset generated for the second event based on the data in the validated first results dataset for the first sub-event of the second event. If the first results dataset for the first sub-event of the second event includes updated values for parameters already stored in the second event master dataset, event orchestration computing platform 110 may replace the current values of these parameters in the second event master dataset with the updated values. If the first results dataset for the first sub-event of the second event includes new parameters and values that are not currently in the second event master dataset, event orchestration computing platform 110 may add these new parameters and values to the second event master dataset.

At step 229, event orchestration computing platform 110 may determine a second sub-event associated with the second event. In determining the second sub-event associated with the second event, event orchestration computing platform 110 may access the second event protocol associated with the second event type (i.e. the event type of the second event). Event orchestration computing platform 110 may identify, within the second event protocol, the second sub-event listed in the second sequence of sub-events. For example, the second event may be a payment transaction, and the second sub-event may be unauthorized use analysis of the payment, sanctions analysis of the payment, a clearing of the payment, a settlement of funds associated with the payment, and the like. In other embodiments, a second sub-event associated with the second event may be determined from the second results dataset. For example, the second results dataset may include an indication of the second sub-event. In another example, the second results dataset may include data directing event orchestration computing platform 110 to a specific sub-event in the second event protocol that is to be executed as the second sub-event. Utilizing data from the second results dataset to determine the second sub-event for the second event allows for a flexible execution of the second event protocol. For example, execution of one or more sub-events in the second event protocol may be bypassed based on the contents of the second results dataset, therefore resulting in an execution of only a subset of the sub-events listed in the second event protocol in certain instances.

At step 230, event orchestration computing platform 110 may send one or more commands to event dataset customization engine 120 to generate a customized dataset to be utilized for execution of the second sub-event of the second event. As noted above, each event protocol may include, in part, a sequence of sub-events that are to be executed in order to complete orchestration of each event of that event type. Each of the event protocols may further include one or rules for each sub-event, wherein the rules may specify the computing device that is to execute the sub-event, one or more command(s) to be sent to the computing device that is to execute the sub-event, and the contents of a customized dataset that is to be utilized by the computing device when executing the sub-event. The contents of the customized dataset may be determined based on the data requirements for execution of the sub-event and the capabilities of the computing device that is to execute the sub-event. For example, the rules for the second sub-event in the second event protocol may indicate that the second sub-event is to be executed by external sub-event processor 155. External sub-event processor 155 may be operated by and/or configured to process events associated with a second service provider or entity, such as a payment processor, a credit network, a debit network, a digital wallet service, and/or the like. The rules for the second sub-event of the second event may further specify that execution of the second sub-event of the second event only requires a second subset of the data stored in the second master event dataset generated for the second event. It may be advantageous to transmit only the required data (i.e. the second subset of data) to external sub-event processor 155 to reduce network traffic (i.e. bandwidth usage) and/or to reduce the amount of data exposed to potential security risks. In one example, external sub-event processor 155 may be a legacy computing system (such as a legacy computing server) or a different type of computing system. In this case, it may be necessary to convert the second subset of data into a different format that may be processed by external sub-event processor 155. Accordingly, event orchestration computing platform 110 may generate one or more commands instructing event dataset customization engine 120 to generate a second event customized dataset for the second sub-event of the second event that includes the second subset of data from the second master event dataset stored in event dataset customization engine 120. Event orchestration computing platform 110 may further generate one or more commands instructing event dataset customization engine 120 to convert the second subset of data into a specified format (i.e. a format that may be required by external sub-event processor 155). Event orchestration computing platform 110 may then send the generated commands to event dataset customization engine 120.

At step 231, event orchestration computing platform 110 may receive the second event customized dataset for the second sub-event of the second event from event dataset customization engine 120. Event dataset customization engine 120 may have generated the second event customized dataset for the second sub-event of the second event by extracting the requested second subset of data from the second event master dataset generated for the second event. Event dataset customization engine 120 may then have converted the second subset of data to the format required by external sub-event processor 155 or may have utilized a separate conversion engine (not shown). Alternatively, event orchestration computing platform 110 may receive the storage location of the second event customized dataset for the second sub-event of the second event from event dataset customization engine 120.

Turning to FIG. 2H, at step 232, event orchestration computing platform 110 may send the second event customized dataset for the second sub-event of the second event and one or more event orchestration commands specified in the rules for the second sub-event to external sub-event processor 155. For example, event orchestration computing platform 110 may send the second event customized dataset for the second sub-event of the second event and one or more event orchestration commands specified in the rules for the second sub-event to external sub-event processor 155 via external event processing interface 140. Event orchestration computing platform 110 may generate the one or more event orchestration commands based on the commands specified in the rules for the second sub-event in the second sequence of sub-events in the second event protocol. Alternatively, event orchestration computing platform 110 may send the storage location of the second event customized dataset for the second sub-event of the second event to external sub-event processor 155. Sending the storage location of the second event customized dataset for the second sub-event of the second event instead of the second event customized dataset for the second sub-event of the second event in its entirety may reduce the traffic sent on the communication channels between event orchestration computing platform 110 and external sub-event processor 155.

At step 233, event orchestration computing platform 110 may receive a second results dataset for the second sub-event from external sub-event processor 155. The second results dataset for the second sub-event may include data generated by external sub-event processor 155 during, or as a result of, execution of the second sub-event of the second event. At step 234, event orchestration computing platform 110 may validate the second results dataset for the second sub-event received from external sub-event processor 155. In validating the second results dataset for the second sub-event, event orchestration computing platform 110 may access the one or more rules defined for the second sub-event within the second event protocol associated with the second event type (i.e. the event type of the second event). The one or more rules defined for the second sub-event may include information defining the data that is to be received from external sub-event processor 155 as a result of external sub-event processor 155 executing the second sub-event. Event orchestration computing platform 110 may compare the information in the one or more rules defined for the second sub-event within the second event protocol associated with the second event type to the second results dataset for the second sub-event received from external sub-event processor 155. If the validation indicates that the correct data is included in the second results dataset for the second sub-event, event orchestration computing platform 110 may proceed to the next step. If there is an error within the second results dataset for the second sub-event, event orchestration computing platform 110 may transmit a notification to external sub-event processor 155 indicating that the second sub-event should be re-executed by external sub-event processor 155. Alternatively, event orchestration computing platform 110 may transmit a request for the omitted data to external sub-event processor 155.

At step 235, event orchestration computing platform 110 may update the second event master dataset generated for the second event. For example, event orchestration computing platform 110 may update the second event master dataset generated for the second event based on the data in the validated second results dataset for the second sub-event. If the second results dataset for the second sub-event includes updated values for parameters that are already in the second event master dataset, event orchestration computing platform 110 may replace the current values of these parameters in the second event master dataset with the updated values. If the second results dataset includes new parameters and values that are not currently stored in the second event master dataset, event orchestration computing platform 110 may add these new parameters and values to the second event master dataset.

At step 236, event orchestration computing platform 110 may update one or more master records associated with the second event and stored in event recording computing platform 130. For example, event orchestration computing platform 110 may update one or more master records associated with the second event and stored in event recording computing platform 130 upon determining that orchestration of the second event is complete. Event orchestration computing platform 110 may determine that orchestration of the second event is complete based on the contents of the second event protocol associated with the second event. As noted above, the second event protocol may include a sequence of sub-events that must be executed in order to complete orchestration of events of the second event type, such as the second event. Each of the sub-events in the sequence of sub-events may include one or more rules. The one or more rules of the last sub-event in the sequence of sub-events for the second event protocol may include an indication that once the last sub-event has been executed, no further sub-events need to be executed for events of the second event type. In other embodiments, one or more rules of the last sub-event in the sequence of sub-events for the second event protocol may include an indication that once the last sub-event has been executed, event orchestration of another event is to be triggered, thus resulting in a recursive orchestration of events. Once event orchestration computing platform 110 has updated the second event master dataset at step 235, event orchestration computing platform 110 may determine that the second sub-event is the last sub-event in the sequence of sub-events for the second event protocol. Accordingly, event orchestration computing platform 110 may update one or more master records associated with the second event and stored in event recording computing platform 130 to indicate that orchestration of the second event has been completed. Event orchestration computing platform 110 may update the one or more master records associated with the second event and stored in event recording computing platform 130 to further indicate the completion date and/or time of orchestration of the second event. Event orchestration computing platform 110 may update the one or more master records associated with the second event and stored in event recording computing platform 130 to include the contents or storage location of the second event master dataset.

FIG. 5 depicts an illustrative method for multicomputer processing of an event request from an event origination device with centralized event orchestration in accordance with one or more example embodiments. Referring to FIG. 5, at step 500, a computing platform having at least one processor, a memory, and a communication interface may receive, via the communication interface, a first event request to orchestrate a first event. At step 505, the computing platform may determine a first sub-event associated with the first event. At step 510, the computing platform may receive a first event customized dataset for the first sub-event. At step 515, the computing platform may generate one or more orchestration commands for the first sub-event. At step 520, the computing platform may send the one or more orchestration commands and the first event customized dataset to a first sub-event processing device. At step 525, the computing platform may receive a first results dataset from the first sub-event processing device. At step 530, the computing platform may update a master event dataset associated with the first event based on the first results dataset. At step 535, the computing platform may determine a second sub-event associated with the first event. At step 540, the computing platform may receive a second event customized dataset for the second sub-event. At step 545, the computing platform may generate one or more orchestration commands for the second sub-event. At step 550, the computing platform may send the second event customized dataset and the one or more orchestration commands to a second sub-event processing device. At step 555, the computing platform may receive a second results dataset from the second sub-event processing device. At step 560, the computing platform may update the master event dataset associated with the first event based on the second results dataset.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
receive, via the communication interface, from a first event origination device, a first event request for a first event;
determine a first sub-event associated with the first event;
receive, via the communication interface, from an event dataset customization engine, a first event customized dataset generated for the first sub-event;
generate, based on the first sub-event associated with the first event received from the first event origination device, one or more first event orchestration commands directing a first sub-event processing device to execute the first sub-event;
send, via the communication interface, to the first sub-event processing device, the first event customized dataset and the one or more first event orchestration commands directing the first sub-event processing device to execute the first sub-event;
receive, via the communication interface, from the first sub-event processing device, a first results dataset; and
update, based on the first results dataset, a first master event dataset associated with the first event.

2. The computing platform of claim 1, wherein determining the first sub-event comprises:
determining a first event type of the first event;
accessing, in an event protocol database, a first event protocol of the first event type; and
determining the first sub-event based on contents of the first event protocol.

3. The computing platform of claim 2, wherein the memory stores additional computer-readable instructions that, when executed by the at least one processor, cause the computing platform to:
prior to determining the first sub-event associated with the first event, sending a command to the event dataset customization engine to generate the first master event dataset within the event dataset customization engine.

4. The computing platform of claim 3, wherein the first event customized dataset is generated based in part on the first master event dataset.

5. The computing platform of claim 2, wherein the memory stores additional computer-readable instructions that, when executed by the at least one processor, cause the computing platform to:
validate contents of the first event request with input data requirements specified by the first event protocol.

6. The computing platform of claim 2, wherein the memory stores additional computer-readable instructions that, when executed by the at least one processor, cause the computing platform to:
validate contents of the first results dataset with output data requirements specified for the first sub-event within the first event protocol.

7. The computing platform of claim 2, wherein the memory stores additional computer-readable instructions that, when executed by the at least one processor, cause the computing platform to:
   determine a second sub-event associated with the first event;
   receive, via the communication interface and from the event dataset customization engine, a second event customized dataset generated for the second sub-event;
   generate, based on the second sub-event associated with the first event received from the first event origination device, one or more second event orchestration commands directing a second sub-event processing device to execute the second sub-event;
   send, via the communication interface and via an external event processing interface, to the second sub-event processing device, the second event customized dataset and the one or more second event orchestration commands directing the second sub-event processing device to execute the second sub-event;
   receive, via the communication interface and via the external event processing interface, from the second sub-event processing device, a second results dataset; and
   update, based on the second results dataset, the first master event dataset associated with the first event.

8. The computing platform of claim 7, wherein determining the second sub-event associated with the first event comprises:
   accessing, in the event protocol database, the first event protocol of the first event type; and
   determining the second sub-event based on contents of the first event protocol.

9. The computing platform of claim 7, wherein the memory stores additional computer-readable instructions that, when executed by the at least one processor, cause the computing platform to:
   validate contents of the second results dataset with output data requirements specified for the second sub-event within the first event protocol.

10. The computing platform of claim 1, wherein the memory stores additional computer-readable instructions that, when executed by the at least one processor, cause the computing platform to:
   update one or more records to indicate that the first event has been completed.

11. The computing platform of claim 1, wherein the memory stores additional computer-readable instructions that, when executed by the at least one processor, cause the computing platform to:
   receive, via the communication interface, from a second event origination device, a second event request for a second event;
   determine a second sub-event associated with the second event;
   receive, via the communication interface and from the event dataset customization engine, a second event customized dataset generated for the second sub-event associated with the second event;
   generate, based on the second sub-event associated with the second event received from the second event origination device, one or more second event orchestration commands directing a second sub-event processing device to execute the second sub-event;
   send, via the communication interface, to the second sub-event processing device, the second event customized dataset and the one or more second event orchestration commands directing the second sub-event processing device to execute the second sub-event;
   receive, via the communication interface, from the second sub-event processing device, a second results dataset; and
   update, based on the second results dataset, a second master event dataset associated with the second event.

12. The computing platform of claim 11, wherein determining the second sub-event comprises:
   determining a second event type of the second event;
   accessing, in an event protocol database, a second event protocol of the second event type; and
   determining the second sub-event based on contents of the second event protocol.

13. The computing platform of claim 12, wherein the memory stores additional computer-readable instructions that, when executed by the at least one processor, cause the computing platform to:
   prior to determining the second sub-event associated with the second event, sending a command to the event dataset customization engine to generate the second master event dataset within the event dataset customization engine.

14. The computing platform of claim 13, wherein the second event customized dataset is generated based in part on the second master event dataset.

15. The computing platform of claim 12, wherein the memory stores additional computer-readable instructions that, when executed by the at least one processor, cause the computing platform to:
   validate contents of the second event request with input data requirements specified by the second event protocol.

16. The computing platform of claim 12, wherein the memory stores additional computer-readable instructions that, when executed by the at least one processor, cause the computing platform to:
   validate contents of the second results dataset with output data requirements specified for the second sub-event within the second event protocol.

17. The computing platform of claim 12, wherein the memory stores additional computer-readable instructions that, when executed by the at least one processor, cause the computing platform to:
   determine a third sub-event associated with the second event;
   receive, via the communication interface and from the event dataset customization engine, a third event customized dataset generated for the third sub-event;
   generate, based on the third sub-event associated with the second event received from the second event origination device, one or more third event orchestration commands directing a third sub-event processing device to execute the third sub-event;
   send, via the communication interface and via an external event processing interface, to the third sub-event processing device, the third event customized dataset and the one or more third event orchestration commands directing the third sub-event processing device to execute the third sub-event;
   receive, via the communication interface and via the external event processing interface, from the third sub-event processing device, a third results dataset; and
   update, based on the third results dataset, the second master event dataset associated with the second event.

18. The computing platform of claim 17, wherein determining the third sub-event associated with the second event comprises:
  accessing, in the event protocol database, the second event protocol of the second event type; and
  determining the third sub-event based on contents of the second event protocol.

19. A method, comprising:
  at a computing platform comprising at least one processor, memory, and a communication interface:
    receiving, by the at least one processor, via the communication interface, from a first event origination device, a first event request for a first event;
    determining, by the at least one processor, a first sub-event associated with the first event;
    receiving, by the at least one processor, via the communication interface and from an event dataset customization engine, a first event customized dataset generated for the first sub-event;
    generating, by the at least one processor, based on the first sub-event associated with the first event received from the first event origination device, one or more first event orchestration commands directing a first sub-event processing device to execute the first sub-event;
    sending, by the at least one processor, via the communication interface, to the first sub-event processing device, the first event customized dataset and the one or more first event orchestration commands directing the first sub-event processing device to execute the first sub-event;
    receiving, by the at least one processor, via the communication interface, from the first sub-event processing device, a first results dataset; and
    updating, by the at least one processor, based on the first results dataset, a first master event dataset associated with the first event.

20. One or more non-transitory computer-readable media storing instructions that, when executed by a computing platform comprising at least one processor, memory, and a communication interface, cause the computing platform to:
  receive, via the communication interface, from a first event origination device, a first event request for a first event;
  determine a first sub-event associated with the first event;
  receive, via the communication interface and from an event dataset customization engine, a first event customized dataset generated for the first sub-event;
  generate, based on the first sub-event associated with the first event received from the first event origination device, one or more first event orchestration commands directing a first sub-event processing device to execute the first sub-event;
  send, via the communication interface, to the first sub-event processing device, the first event customized dataset and the one or more first event orchestration commands directing the first sub-event processing device to execute the first sub-event;
  receive, via the communication interface, from the first sub-event processing device, a first results dataset; and
  update, based on the first results dataset, a first master event dataset associated with the first event.

* * * * *